US009552739B2

(12) United States Patent
Glazier

(10) Patent No.: US 9,552,739 B2
(45) Date of Patent: Jan. 24, 2017

(54) COMPUTER-BASED TUTORING METHOD AND SYSTEM

(75) Inventor: Glenn Edward Glazier, Rockaway, NJ (US)

(73) Assignee: Intellijax Corporation, Rockaway, NJ (US)

( * ) Notice: Subject to any disclaimer, the term of this patent is extended or adjusted under 35 U.S.C. 154(b) by 1407 days.

(21) Appl. No.: 12/472,790

(22) Filed: May 27, 2009

(65) Prior Publication Data

US 2009/0298039 A1    Dec. 3, 2009

Related U.S. Application Data

(60) Provisional application No. 61/130,243, filed on May 29, 2008.

(51) Int. Cl.
*G09B 7/00* (2006.01)
*G09B 7/08* (2006.01)

(52) U.S. Cl.
CPC .. *G09B 7/08* (2013.01); *G09B 7/00* (2013.01)

(58) Field of Classification Search
CPC .................................... G09B 7/00; G09B 7/02
USPC ......... 434/118, 322, 323, 350–354, 360–365
See application file for complete search history.

(56) References Cited

U.S. PATENT DOCUMENTS

| | | | |
|---|---|---|---|
| 3,408,749 A | 11/1968 | Brudner | |
| 4,586,905 A | 5/1986 | Groff | |
| 5,441,415 A | 8/1995 | Lee et al. | |
| 5,727,950 A | 3/1998 | Cook et al. | |
| 6,032,141 A | 2/2000 | O'Connor et al. | |
| 6,523,007 B2 | 2/2003 | Layng et al. | |
| 6,540,520 B2 | 4/2003 | Johnson et al. | |
| 6,570,555 B1 * | 5/2003 | Prevost et al. | 345/156 |
| 6,890,179 B2 | 5/2005 | Rogan et al. | |
| 6,971,881 B2 * | 12/2005 | Reynolds | G09B 5/00 434/236 |
| 2002/0138590 A1 * | 9/2002 | Beams | G09B 7/00 709/218 |
| 2003/0077559 A1 * | 4/2003 | Braunberger | G09B 7/00 434/322 |
| 2003/0148253 A1 | 8/2003 | Sacco et al. | |

(Continued)

OTHER PUBLICATIONS

Cunha, M et al., "Educational Technology for Collaborative Virtual Environment", Computer Supported Cooperative Work in Design, 2008, 12th International Conference on IEEE, Apr. 16, 2008, pp. 716-720.

(Continued)

*Primary Examiner* — Robert J Utama
*Assistant Examiner* — Sadaruz Zaman
(74) *Attorney, Agent, or Firm* — Chiesa Shahinian & Giantomasi PC

(57) ABSTRACT

Disclosed are a computer-based tutoring method and system in which an animated tutor, an animated avatar, and at least one animated group member selected by a user are displayed on a screen. A tutorial is presented by the animated tutor. During the tutorial, an interactive question is presented. An answer is received from the user. If the answer is correct, the tutorial continues. If the answer is incorrect, a second tutorial is presented. The second tutorial is based on the incorrect answer received from the user. Dialog between the animated tutor, the animated avatar, and the animated group members may be held. Dialog among animated group members may be held.

26 Claims, 36 Drawing Sheets

(56) References Cited

U.S. PATENT DOCUMENTS

| | | | | |
|---|---|---|---|---|
| 2005/0095569 A1* | 5/2005 | Franklin | ............ | G09B 7/00 434/350 |
| 2006/0248461 A1* | 11/2006 | Yamada et al. | ............ | 715/706 |
| 2007/0020604 A1* | 1/2007 | Chulet | ............ | G09B 7/02 434/350 |
| 2007/0134644 A1* | 6/2007 | Jones et al. | ............ | 434/365 |
| 2007/0202484 A1* | 8/2007 | Toombs et al. | ............ | 434/350 |
| 2007/0231780 A1* | 10/2007 | Shulman | ............ | G09B 7/08 434/350 |
| 2007/0298404 A1* | 12/2007 | Amell | ............ | G09B 7/00 434/350 |
| 2008/0037836 A1* | 2/2008 | Chen | ............ | G06K 9/00281 382/118 |
| 2008/0254419 A1* | 10/2008 | Cohen | ............ | 434/219 |
| 2009/0226870 A1* | 9/2009 | Minotti | ............ | G09B 7/00 434/322 |
| 2009/0311658 A1* | 12/2009 | Polivka | ............ | G09B 5/00 434/350 |
| 2010/0190143 A1* | 7/2010 | Gal | ............ | G09B 7/00 434/322 |
| 2012/0130717 A1* | 5/2012 | Xu | ............ | G06T 13/40 704/258 |

OTHER PUBLICATIONS

Oakley, B et al., "Implementation of a Virtual Classroom for an Introductory Circuit Analysis Course", Frontiers in Education Conference, 1994, 24th Annual Conference Proceedings San Jose, CA Nov. 2-6, 1994, pp. 279-283.

International Search Report corresponding to International Application No. PCT/US2009/003248 filed May 28, 2009, (4 pages).

Written Opinion of the International Searching Authority corresponding to International Application No. PCT/US2009/003248 filed May 28, 2009 (8 pages).

* cited by examiner

FIG. 11A

L00000: You've all heard of Trigonometry, or "trig" for short, but I have to tell you that there are a LOT of topics within trig. And what does Trig mean, you might ask? Well, firstly, "tri" means three, and "metry" comes from "metrien," meaning to measure. And what has different measures . . . three different angle measures? Triangles, of course.

So, what we're really doing here is finding how the three sides of all the different triangles relates to its angles.

First we'll start off by using some triangles you learned in Geometry.

L00010: If you recall, whenever we had either a 30-60-90 or 45-45-90 triangle, . . . if we knew one of the sides, we could always figure out the other ones.

L00020: In fact, let's say we have a 30 degree -60 degree -90 degree triangle with a hypotenuse of length 10. What would be the length of the other sides?

L00021: That is correct.

L00022: Sorry, that's incorrect. Let's look into this further.

L00030: What about the 45-45-90 triangle. What are the lengths of the sides of this triangle if one of its legs is 1?

L00031: That is correct.

L00032: Sorry, that's incorrect. Let's look into this further.

L00040: So, look again at the 30 degree -60 degree -90 degree triangle [2 second pause]

you and I – and others – have learned the sides of this triangle. We know that the shorter leg is exactly half as long as the hypotenuse.

If the hypotenuse is 10, then the shorter leg is 5. So if this time we make the hypotenuse of length 2, what would be the shorter side's length?

L00050: Sgt. Gravis: ½.

L00060: Noooo, as we saw before, whatever the hypotenuse is, the side opposite the 30 angle is half as long. So, if the hypotenuse is 2, then what is that shorter leg?

FIG. 11B

L00070: Sgt Gravis: Oh, 1 – half of 2.

L00080: Right! And another way of saying this is that the ratio of the shorter leg to the hypotenuse is . . .

L00090: All 3 in unison: 1 to 2

L00100: Absolutely! [pause] And what about the 45-45-90 triangle [pause] – what is the ratio of the leg opposite 45 [] to the hypotenuse?

L00110: Amoeba: It's 1 over root 2 . . . but you know what, it's a bit of a drag having to keep on saying "ratio of leg opposite this angle to hypotenuse." Can't we come up with some word for this?

L00120: Hey guys, it's already done! (**1)

The word "sine" –abbreviated S – I – N –is exactly that:

Sin theta = <u>leg opposite to theta</u>, or simply "sin theta=opposite/hypotenuse" (**2)
$\qquad$ Hypotenuse

L00130: Amoeba: Wait a minute, what's "theta"?

L00140: Bea: Oh, that's a Greek letter they like to us to represent angles.

L00150: And in fact, the word "sine" comes from the Latin "sinus," meaning "a bend or a gulf."

L00160: Sgt Gravis: Yah yah yah . . . okay, get on with it.

L00170: So, with the 60 angle [], what would be the sine of 60?

L00180: Correct!

L00190: No [] opposite the 60 degree angle is the square root of 3, [] and the hypotenuse is 2. []

L00200: It's square root of 3 over 2.

L00210: So, we can find the sine of 30 [] 60 [] and 45 []. Excellent ! []

FIG. 11C

L00220: Bea: What if we didn't want to find the ratio, in the 30-60-90 triangle, of the shorter leg to the hypotenuse, but instead the longer leg to the hypotenuse???

L00230: Sgt. Gravis: Yah, or what about the ratio of the shorter leg to the longer leg???

L00240: Good question, guys. And we do call those ratios something.

The word "cosine" – abbreviated C – O – S – is *that* ratio:

Cos theta = <u>leg adjacent to theta</u>; or simply "cosine theta = adjacent/hypotenuse"
             Hypotenuse Also there is the ratio called "tangent," which abbreviated T – A – N:

Tan theta = <u>leg opposite to theta</u> , or simply "tangent theta =opposite/adjacent"
             leg adjacent to theta

L00250: Bea: Hey, isn't tangent one of those lines from Geometry?

L00260: Absolutely, and we'll get into that later why it's called that. We'll also talk later about why the cosine is called just that – "co-" followed by "sine."

L00265: For now, we can find the sine, coSine, and tangent of 30 degrees, 45 degrees, and 60. Hmmm, what about the sine, coSine, and tangent of, say, 120 degrees? Can we do that?

L00270: Amoeba: But 120 degrees is too big to fit into a right triangle, and don't we need to have a right triangle in order to have a hypotenuse?

L00280: Yes, and so we are going to work around this little bump in the road.

L00281: Sgt. Gravis: Say, where are you from anyway?

L00282: I'm from New Jersey . . . but originally, I'm from the Gamma Cluster within Sector 5 of the M-40 Galaxy . . . oh yah, and I am from the future as well. [7 second pause]

L00283: What is the measure of this angle?

FIG. 11D

L00290: Bea: It looks to be 30 degrees.

L00300: Nope, not anymore. Geometry says it's 30 degrees, but Trig doesn't. [pause] *This* is 30 degrees. ([pause], Animation: show tilting 30 angle.)

L00310: What about his angle? Looks like 90 degrees doesn't it? Not according to Trig (and again, by that I mean "trigonometry"). *Now* it's 90 degrees.

What trig does it is allows us to find the sin, cos, and tan of every angle, no matter how much bigger it is than 90 degrees. And we do this by using the x-y-axis. [pause]

How many sides to an angle, guys?

L00320: Sgt Gravis: Obviously two.

L00330: Right, and you know the 4 Quadrants?
([pause], Animation:4 Quadrants go up.)

Well, from now on, every single angle has its initial ray, lying on the positive x-axis, and its terminal ray rotating counter-clockwise away from it.

L00340: Sgt Gravis: Whoa, whoa, what are you talking about!?!

L00350: Here, look. This is the initial ray of the angle[], and this is the terminal ray[]. You see how the terminal ray is rotated counter-clockwise away from the initial ray?

L00360: Sgt. Gravis: Why counter-clockwise?

L00370: Why not? One has to have one of the rotational directions called positive, and mathematicians have the counter-clockwise rotation as called positive.

So, what does 120 degrees look like? Here it is:
([pause], Animation: The terminal ray rotates away from initial ray.)

Of course, to find the sine, cosine, and tangent of this angle, we still need a right triangle. And so we either draw a perpendicular to the x-axis [] or the y-axis []. Both of those will work in making right triangles.

FIG. 11E

L00380: Bea: Draw it to the y-axis.

L00390: Sorry, guys, but we draw the perpendicular to the x-axis.

L00400: Bea: But you said we could draw it to either!

L00410: Well, yes, theoretically you can, but we've just gotten into the habit of always drawing perpendiculars to the x-axis, and so let's stick with this.

But you could just as easily have built up this whole system of drawing to the y-axis[]. It would have worked, but we just got used to drawing to the x-axis[], and so we will stick with that.

You see how this creates a right triangle?[]

One thing about x-y-axis is that you're living in the world of Etch-A-Sketch.

There are only 4 options: Left, Up, Right, or Down. Nothing else. So, looking at this 120 angle, how would you travel from the origin [] to any point on the terminal ray? Can you travel along the terminal ray itself to get to, say, this point here?

L00420: Bea: Yah, why not?

L00430: Nooooo, again, the ONLY 4 options are: Left, Up, Right, Down. So, given that, we would have to travel either up, then left [2 second pause], OR left, then up [2 second pause].

Which one?

L00440: You got it! And do you know why this is preferable?

L00450: Sorry, that's not correct.

L00600: We travel left, *then* up. To travel up, then left, that would draw a perpendicular to the y-axis, and remember, we decided to go with the convention of always having perpendiculars to the x-axis.

L00610: So, when we want to find the sine of 120, we're going to pick a point – any point – on the terminal ray and draw from the origin left and then up to that point. How long do we want – I repeat, want – to make this hypotenuse?

FIG. 11F

L00620: Bea: We can make it any length!

L00630: Right, so how about making it 2?

L00640: Amoeba: Why 2?

L00650: That's an excellent question, especially since the hypotenuse could be any length, as we had discussed.

L00660: Recall the 30-60-90 triangle: See how the sides are1, root of 3, and 2? See how the hypotenuse is 2? That's why. So, if you just hold on, you'll see why I chose this length.

L00670: So, starting at the origin – you know, where the x and y axis intersect – we draw left [], and then up [], and that gets us to this point here [] which is a distance of 2 units from the origin. []

This, by the way, is called a vector, when you have both a length and a direction. You'll see a lot of that when you take Physics.

L00671: Amoeba: Ohhhhhhhhhhhhhh, you know what, I just figured out what's been confusing me. All this time I couldn't quite understand why you've been starting at the origin, then for this120 degree angle, going left and then up [ ] / was starting at this point on the terminal ray [ ] dropping down and then heading right, back to the origin, which is the exact opposite of what you're doing.

But it just dawned on me – all points on an x-y-axis are in *reference* to the origin, right? Meaning, like, this point here, (5/-2) – from the origin, it's 5 units to the right, and then 2 units down.

This point, (-3,6) – to get there, we would start at the origin and go 3 units to the left, and then 6 units up.

(-3, -4) – that's 3 to the left of the origin, and then 4 down.

Okay, I'm sorry Mr. Jax, but I get it now. All rays (or vectors), they start at the origin. Then they go either left and then up or down, or they go right and then up or down, but it's ALWAYS starting from the origin, right?

FIG. 11G

L00672: Absolutely! (The first word from 00100 of the 000 Series, part 1)

L00673: Amoeba: And, well, I see why it's called the origin – it's where we always or-ig-i-nate . . . or as you would say, [in a British accent] "it's where we always originate."

Okay, don't worry about me, I got it now. And you were about to say . . . . . . .???

L00680: And what about the ray going to the left – is it negative or positive?

L00690: Correct!

L00700: No,

L00710: It goes to the Left, so it's negative. To the left is negative [ ], to the right is positive, just as going up is positive [ ], and heading down is negative.

L00720: And this ray, or vector, going to the left – what is its length?

L00730: Sgt. Gravis: Hey bud, I have no idea. Where's the 30 degree angle? Or the 60 degree angle? Or the 45 degree angle? I don't see any angle there?

L00740: Excellent question. Okay, let's recap what we're doing: Whatever angle we're dealing with, we pick a point – *any point!* – on the terminal ray and always draw a perpendicular to the x-axis.

Do you see the perpendicular dropping down to the x-axis here? [ ]

And the angle that our terminal ray makes with this x-axis[ ], that's the angle we're going to use. It's called the "reference angle."

To reiterate, we could have drawn a perpendicular to the y-axis [ ], and this here [ ] would be our "reference angle." OR we could draw a perpendicular to the x-axis [ ], and this here [ ] would be our "reference angle."

Of course, we chose to draw to the x-axis, and that's what we'll do with every trig angle.

FIG. 11H

L00750: So, with the 120 degree angle, what is the reference angle? 60 degree right?

L00760: A little reminder how we got that, whether you got it right or wrong: Remember how a straight angle is 180 degrees? ([3 second pause], Animation: show the straight angle.) and so if this straight angle [ ] is split up into two angles, one of them being 120 degrees [ ], then the other is how much? 60 degrees, right? Does this make sense?

L00770: So, with a reference angle of 60 degrees, what is this ray [ ], or vector as they like to call it in Physics?

L00780: That's correct.

L00790: No, negative 1. *Negative* because it's going to the Left; *1* because it's opposite the 30 degree angle. And what 30 degree angle? The one at the top; the two angle are 60 degrees and 90 degrees.

L00800: And what about *this* ray [ ]?

L00810: That's correct.

L00820: No positive root 3. *Positive* because it's going up; *root 3* because it's opposite the 60 degree angle [ ].

L00830: Now with all of the ray displacements in place – again, they're not really lengths but *displacements*; it does matter whether you're going to the left or the right, whether you're heading up or down – we're trying to find the sine of 120 degrees.

Hmmmm, do you notice a problem??? Do you notice how the 120 degrees is too big to fit inside the right triangle? No problem. We're going to use this reference 60 degrees in its place.

So, what is the sine of this *reference* 60 degrees?

L00840: That's correct.

FIG. 11I

L00850: No, root 3 over 2. Opposite the reference 60 degrees is root 3; and the hypotenuse is 2. So, opposite over hypotenuse . . . . root 3 over 2.

L00860: And the cosine of this reference 60 degrees . . . and I cannot emphasize it enough: This 60 degree angle [ ] is actually a 120 degree in disguise [ ]. A true 60 degree would look like this: ([3 second pause], Animation: showing the 60 degree angle.)

And so a 60 degree angle in the second quadrant is *really* 120 degree in disguise.

I want to go through that one more time, because this is where most students have their difficulties:

So, what's the cosine of this 60 degrees?

L00870: That's correct.

L00880: No, -1 over 2. The adjacent leg to the reference 60 degrees is -1; and the hypotenuse is 2. So, cosine, adjacent leg over hypotenuse . . . . -1 over 2.

L00890: And the tangent of this reference 60 degrees . . . which, of course, means we're finding the tangent of 120 degrees?

L00900: That's correct.

L00910: No, its root 3 over -1, which simplifies to just "negative root 3." Tangent is opposite leg over adjacent leg. Opposite to the reference 60 degrees is root 3; the adjacent leg to the reference angle is -1. Opposite over adjacent, root 3 over -1.

L00930: What happens though, when we're asked to find the sin or cos of 90 degrees, or 180 degrees, etc.? It's a little different, and we'll get into that shortly.

L00940: Amoeba: And what about when triangles have angles like 26 degrees? Or what if they're *not* right triangles?

L00960: We'll take a look at triangles that end up in the third and fourth quadrants. We'll talk about why the hypotenuse is always positive. We'll go through all of these things later. For now, let's call it a day. You've been through a lot.

FIG. 12A

L10010: Imagine an equilateral triangle with this side length 10. What are the lengths of each side? [ ] 10, and 10, right"? – Aren't all the sides of an equilateral triangle the same length?

L10020: Now, I'm going to take my compass and place the pointer down here at the bottom and draw an arc. [pause]

L10030: Keeping the compass the same, I'm going to move the pointer up to the top and make another arc. [pause]

L10040: Do you see where they intersect? [ ] If I connect this vertex [ ] with the intersection, what will it do to this side? [ ] And what will it do to this angle?

L10050: Amoeba: I'm pretty sure it bisects – you know, cuts in half – both the angle and that side.

L10060: That's right! This side [ ] is cut in half, this angle [ ] is cut in half. The entire triangle is cut in half.

L10070: So, you see that a 30-60-90 triangle is just an equilateral triangle folded in half. ([pause], Animation: show triangle being folded.)

L10080: See this side here, this side of the original equilateral triangle? What is this same side called once we fold the equilateral triangle in half [ ] and get this right triangle?

L10090: No, in a right triangle, the side opposite the 90 degree angle [ ] is called the Hypotenuse, and the other two sides [ ] are called Legs.

L10100: That's correct, and the other two sides are called legs.

L10110: And what about this side (the one split up in half)?

L10120: That's correct.

L10130: No, actually it's 5, half of 10. Remember, the side of length 10 got cut in half as we folded, or cut, the triangle in half. [ ]

FIG. 12B

L10140: And just as that 10 side got cut in half ([pause], Animation: show triangle being folded), that 60 degree angle got cut in half also ([pause], Animation: show triangle being folded), and so it's now 30 degrees.

So, if the hypotenuse of the 30-60-90 triangle is 10, then the side opposite it is what length? [ ] You can see that it's 5 right?

L10150: Bea: And what about the other side, the one on the bottom – what's it length?

L10160: Well, this is a right triangle. Can't we use . . . what is that theorem about the sides of a right triangle?

Ah yes, the Pythagorean Theorem. A squared plus b squared = c squared.

L10170: Which side is a? which is b? which is c?

L10180: That's correct.

L10190: Actually, no.

L10200: c is the Hypotenuse [ ], and a and b are the two legs . . . and it doesn't matter which leg is a and which one is b ([pause], Animation: a & b switching)

L10210: So, calling the side opposite the 60 degree angle "b," what would we get from the Pythagorean Theorem?

L10220: We have 5 squared + b squared = 10 squared,
which becomes 25 + b squared = 100, [ ] . . .
b squared = 75, [ ] . . . .

L10230: square rooting both sides [ ], we get b = square root of 75.

L10240: Wait, aren't we supposed to reduce that as much as possible into . . . what do they call it, "simplified radical form"? How does root 75 break down?

FIG. 12C

L10241: That's correct.

L10242: Actually no. And you know what? If you don't see how root-75 simplifies to 5-root-3, then you might want to review the section on radicals in Algebra and come back to here later. I promise we'll all be here . . . or *not* be here, depending on who you choose to help. But when it comes to radicals, like with everything else in math, it's not difficult at all once you understand how and *why* it works the way it does.

L10250: So, again you can see that if the hypotenuse is 10, then the short leg – oh, and the short leg, it's opposite which angle, by the way? –

L10260: Sgt. Gravis: 60 degrees.

L10270: No . . . it's opposite the *30* degree angle. The *shortest* side in a triangle is opposite the *shortest* angle. [ ]

L10275: Sgt. Gravis: Oh, right, . . . duh. 30 degrees is the smallest angle in the triangle [ ], and so it's opposite the smallest side. [ ] No, I see that. I was just distracted by this guy to my left who seems to be melting. [pause]

L10280: Ooookay,. . . getting back to this, the short leg will be 5. ([pause], Animation: show the triangle folding in half.)

And the longer leg will be 5 to the root of 3. [ ]

So, whether the 30-60-90 triangle has a hypotenuse of length 2 or 10 or whatever, the shorter leg – which is the leg opposite the 30 degree [ ] – is always half as long as the hypotenuse [ ], and the longer leg is root-3 time as long [ ].

FIG. 13A

L50010: Look at the 45-45-90 triangle. I remember that the longest side, the one opposite the 90 degree angle [ ], is called the hypotenuse? What are the other two sides called again?

L50020: Amoeba: *Legs!*

L50030: And which is the shorter leg and which one is the longer leg?

L50040: Bea: Aren't the 2 legs the same here?

L50050: Absolutely! And why is that?

L50060: Bea: Well, isn't it because they're both opposite 45 degrees, and in a triangle, any time two sides are opposite the same size angle, ([2 second pause], Animation: arrows in triangle.)

aren't they themselves congruent?

L50070: Absolutely! And nice use of that fancy word, "congruent," meaning the same size and same shape.

L50071: That's correct.

L50072: Sorry that's incorrect. It's called "Isosceles."

[Note to James: "Isosceles" is pronounced "I – soss – uh – leez."]

L50080: In fact, it's an "Isosceles Right triangle," given that it's both Isosceles and it has a right angle.

So, obviously, there is no shorter or longer leg; they're both the same.

L50090: And how do we find the hypotenuse?

L50100: Amoeba: Pythagorean Theorem!

L50110: Gotta love that Pythagoras . . . . so 1 squared + 1 squared = c squared.

2 = c squared. Square rooting both sides, [ ] what do we get?

FIG. 13B

L50120: Amoeba: *Root 2!*

L50121: Sgt. Gravis: Show off.

L50130: Amoeba: But wait, don't we get plus or minus root 2? I always remembering having to put "+-" any time I square rooted a variable squared, in this case we're square rooting c squared. They made such a big deal about +- before.

L50140: Technically, yes. However, c is the length of a side of a triangle, and when is a length ever negative? It can't. You wouldn't say you drove negative 3 kilometers, or a person is negative 5 and a half feet tall. Lengths are always positive, and so here, we disregard the negative sign in the plus-minus.

L50150: Amoeba: Oooh, good point.

L50160: You guys might want to go to the section on Quadratics. You probably don't remember, but we talked about that such thing in great length there.

L50170: Sgt. Gravis: "Ooooh boy can't wait." ([2 second pause], Animation: eye roll.)

L50180: So with a 45-45-90 triangle, we can see that the sides are 1, 1, and root 2.

FIG. 14A

L90010: Let's go through a few quick examples.

L90020: Suppose we have the following triangle, with sides of length 3,4, and 5.

L90030: What would be the sine of this angle theta here?

L90040: Amoeba: Not sure. How do we do it again?

L90050: I want to emphasize that that's not the question you want to ask. It's not "What do we do?" or "How do we do this?" The question you want to ask is "What does this mean?" And what does sine mean?

L90060: Amoeba: Opposite over Hypotenuse.

L90070: Right! And what side – no, correction, what *leg* – is opposite theta?

L90080: Amoeba: 3.

L90090: Right! And what's the hypotenuse in this triangle?

L90100: Amoeba: 5.

L90110: Right! And so opposite leg over hypotenuse, 3 divided by 5, or

L90120: Amoeba: Right, I see it – it's three-fifths.

L90130: Absolutely. Does that make sense, or do you want to see another example?

L90140: Eye Guy: No, I got it.

L90150: Eye Guy: I'd like to look at another example.

L90160: Okay, let's look at this right triangle where one of the legs is 5 and the hypotenuse is 6, and this is the angle theta. What's the other leg?

FIG. 14B

L90170: Sgt. Gravis: a-squared plus b-squared = c-squared. So that's a-squared + 5-squared = 6-squared.

Or a-squared + 25 = 36, a-squared = 11, square-rooting both sides, a = root 11.

L90180: So let's do the sine, the cosine, *and* the tangent.

Sine is opposite leg

L90190: over hypotenuse, and in this case,

L90200: Sgt. Gravis: that's 5 over 6.

L90210: Right! And cosine is adjacent leg over hypotenuse,

L90220: Sgt. Gravis: square root of 11 over 6.

L90230: Right! And tangent is opposite over adjacent.

L90240: Sgt. Gravis: That's 5 over 6.

L90250: Ummmm, no.

L90260: Sgt. Gravis: Why not? Opposite theta is 5,

L90270: Bea: and adjacent to theta is 6.

L90280: Well, no, remember again, that when we say "opposite" and "adjacent," we mean "opposite *leg*" and "adjacent *leg*." The 6 isn't even a leg, it's the hypotenuse; and so how can it be an adjacent leg if it's not a leg at all?

L90290: Bea: Good point!

L90300: Of course, and that's why I'm at the top of the screen!

FIG. 14C

L90310: Do you want to see another example?

L90320: Eye Guy: No, I got it.

L90330: Eye Guy: I'd like to look at another example.

L90340: Okay, let's look at this right triangle where one of the legs is 4 and the other leg is 7, and this is the angle theta. What's the hypotenuse?

L90350: Bea: a-squared plus b-squared = c-squared. So that's 4-squared + 7-squared = c-squared.

Or 16 + 49 = c-squared, c-squared = 65, square-rooting both sides, c = square root of 65.

L90360: So let's do the sine, the cosine, *and* the tangent.
Sine is the opposite leg

L90370: over hypotenuse, and in this case,

L90380: Bea: that's 4 divided by root 65.

L90390: Right! And the cosine is adjacent leg over hypotenuse,

L90400: Bea: 7 divided by root 65.

L90410: Right! And tangent is opposite over adjacent.

L90420: Bea: 4-7$^{th}$'s.

L90430: Nicely done! Do you think you have it, or do you want to go through this again?

FIG. 14D

L90440: Eye Guy: No, I got it.

L90450: Eye Guy: I'd like to look at another example.

L90460: Okay, let's look at these problems again.

L90470: So, getting back to what we were speaking of . . . .

COMPUTER-BASED TUTORING METHOD AND SYSTEM

This application claims the benefit of U.S. Provisional Application No. 61/130,243 filed May 29, 2008, which is incorporated herein by reference.

BACKGROUND OF THE INVENTION

The present invention relates generally to education systems, and more particularly to computer-based tutoring methods and systems.

In a traditional education system, an instructor and a group of students meet in a classroom. The instructor gives a lecture, and the students listen. How well a student learns the subject is gauged periodically by grades on homework and tests. Although the traditional education system has been entrenched for centuries, it inherently suffers from a number of deleterious constraints.

One constraint is access. Access to the traditional education system is limited to students who can travel to the classroom and whose schedule may accommodate a specific class. For a full-time student, access is not an issue. For part-time students, including employees receiving professional training, however, travel, schedule, and attendant expenses restrict the opportunities for classroom instruction.

Another constraint is limited opportunity for instructor-student interaction. Lectures are traditionally structured in fixed periods and follow a specified pace to fit within the allotted time. Often there is limited opportunity for questions and answers. Since individual students learn at different paces and may have questions on different portions of the subject, classroom instruction often does not meet the needs of individual students (in contrast to students in aggregate). A related issue is timeliness of feedback. As discussed above, students are evaluated on the basis of grades on homework and tests. Deficiencies in students' understanding of the subject matter are uncovered after they have received poor grades. Depending on the frequency of the homework and tests, students may struggle with new material because they have not yet mastered the previous material. They then must perform remedial study and play catch-up with the current material being taught in class.

Computer-based instruction has provided a more flexible mode of education. One option is software locally installed on an individual personal computer. With the advent of high-speed Internet connections, another option is software loaded on a central server (or system of servers), which may be accessed from remote locations. Access is then no longer constrained by distance and time. Computer-based instruction, however, often shares some of the same limitations as traditional classroom instruction. In particular, instruction modules are highly structured, and students' understanding of the material is tested at periodic intervals (at the end of each module, for example). What are needed are computer-based tutoring methods and systems which adapt to the learning skills of individual students and which provide rapid evaluation of students' performance.

BRIEF SUMMARY OF THE INVENTION

In an embodiment of the invention, an animated tutor, an animated avatar, and at least one animated group member selected by a user are displayed. A first tutorial is presented by the animated tutor. During the first tutorial, a first interactive question is presented. A first answer is received from the user. If the first answer is correct, the first tutorial continues. If the first answer is incorrect, a second tutorial is presented. The second tutorial is based on the incorrect answer received from the user.

These and other advantages of the invention will be apparent to those of ordinary skill in the art by reference to the following detailed description and the accompanying drawings.

BRIEF DESCRIPTION OF THE DRAWINGS

FIG. 11A-FIG. 11I present a script for a first tutorial;

FIG. 12A-FIG. 12C present a script for a second tutorial;

FIG. 13A and FIG. 13B present a script for a third tutorial; and

FIG. 14A-FIG. 14D present a script for a fourth tutorial.

DETAILED DESCRIPTION

Figure 1:
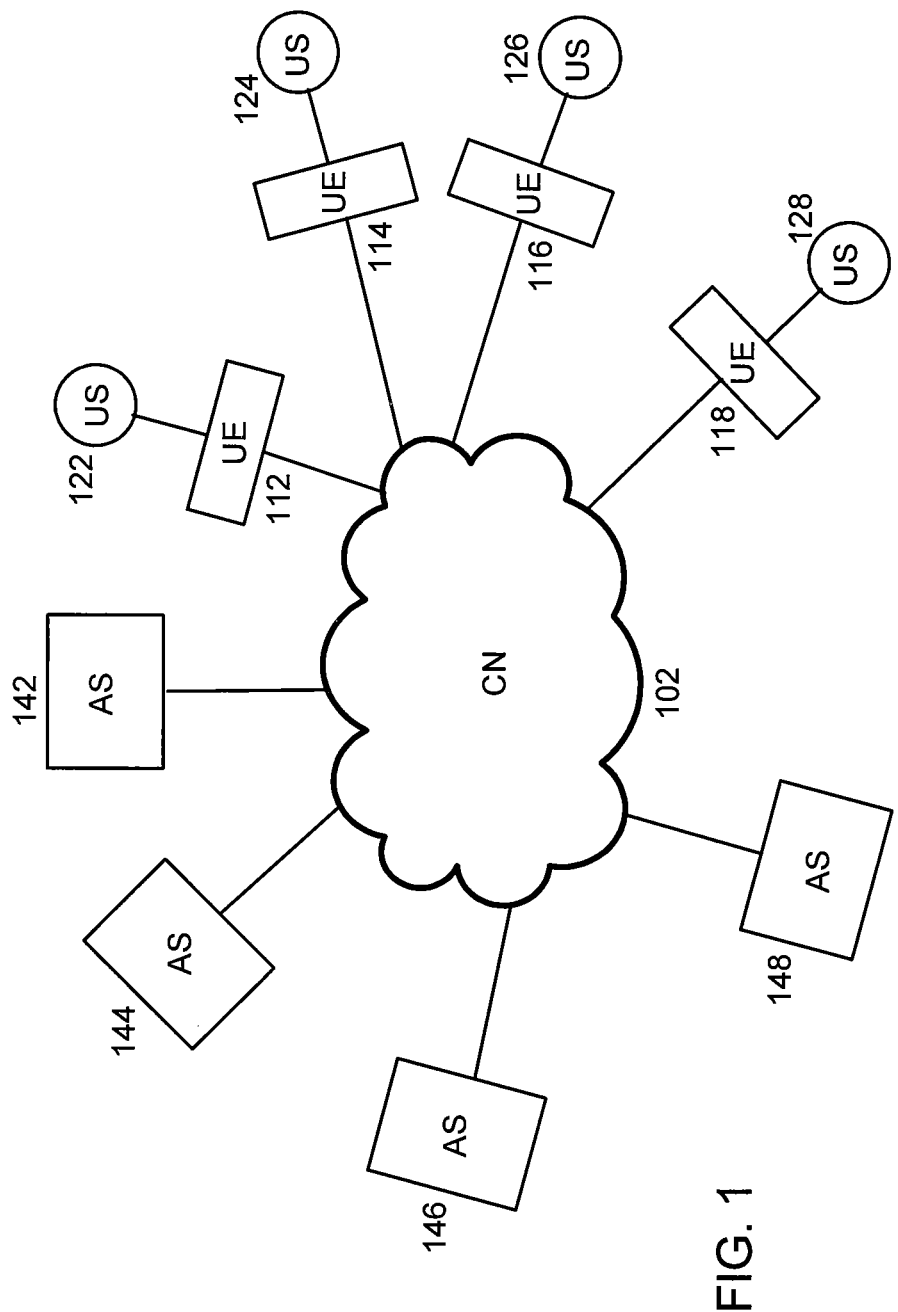
FIG. 1 shows a high-level schematic of a telecommunications network.

FIG. 1 shows a high-level schematic of an example of a telecommunications network that serves as the infrastructure for supporting online computer-based tutoring. A telecommunications network includes the network equipment, network operations software, and communications links for users to access applications. The communications links may be fixed (for example, wire, cable, or optical fiber) or wireless. Users US 122-US 128 connect to core network CN 102 via user equipment UE 112-UE 118, respectively. A personal computer (PC) is one example of user equipment. A wireless smart phone is another example of user equipment. Application servers AS 142-AS 148 provide various user applications, such as computer-based tutoring. An application server may comprise a single machine, a group of machines locally connected, or a group of machines remotely distributed and connected via a communications network. In an embodiment of the invention, users US 122-US 128 access user applications on applications servers AS 142-AS 148 via the Internet. Herein, Internet refers to a private network as well as the global, public Internet.

Figure 2:
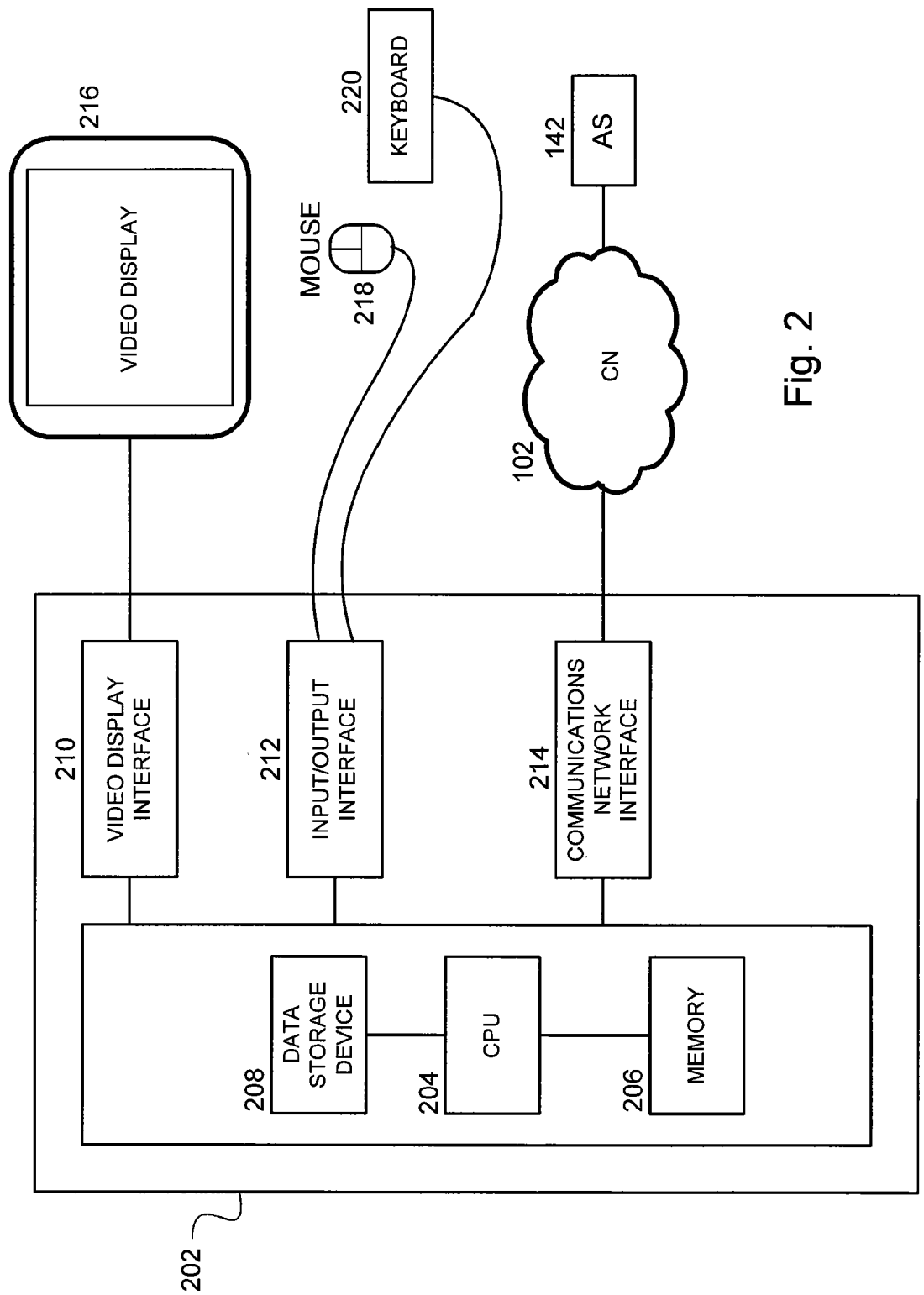
FIG. 2 shows a high-level schematic of a computer used to access a computer-based tutorial system.

Herein, user US 122 is designated as a representative user, and application server AS 142 is designated as a representative application server, in the examples discussed below. Herein, a user is also referred to as a student. In an embodiment of the invention, US 122 accesses AS 142 over the Internet via user equipment UE 112. One embodiment of UE 112 is a personal computer PC 202, as shown schematically in FIG. 2. Personal computer PC 202 may be any type of well-known computer comprising a central processing unit (CPU) 204, memory 206 (also referred to as memory module 206), and data storage device 208 (such as a hard drive). Personal computer PC 202 further comprises user input/output interface 212, which interfaces PC 202 to user input/output devices, such mouse 218 and keyboard 220; video display interface 210, which interfaces PC 202 with video display 216 (for example, a computer monitor); and communications network interface 214. Communications network interface 214, for example, interfaces PC 202 with core network 102, thereby providing communication with AS 142.

User US 122 may execute commands (perform functions or operations) on AS 142 via a user interface, such as a graphical user interface (GUI), on PC 202. User US 122, for example, may log onto a website, identified by a uniform resource locator (URL), hosted by an application provider, which assigns a user account to US 122. Herein, a user account refers to a set of software and hardware resources. For example, a user account may provide the software resources for performing the application. A user account may also provide storage space on a disk drive to store user information. An application may support multiple user accounts, with a specific user account assigned to a specific user. Herein, a user accesses an application via a user account.

Figure 3A:
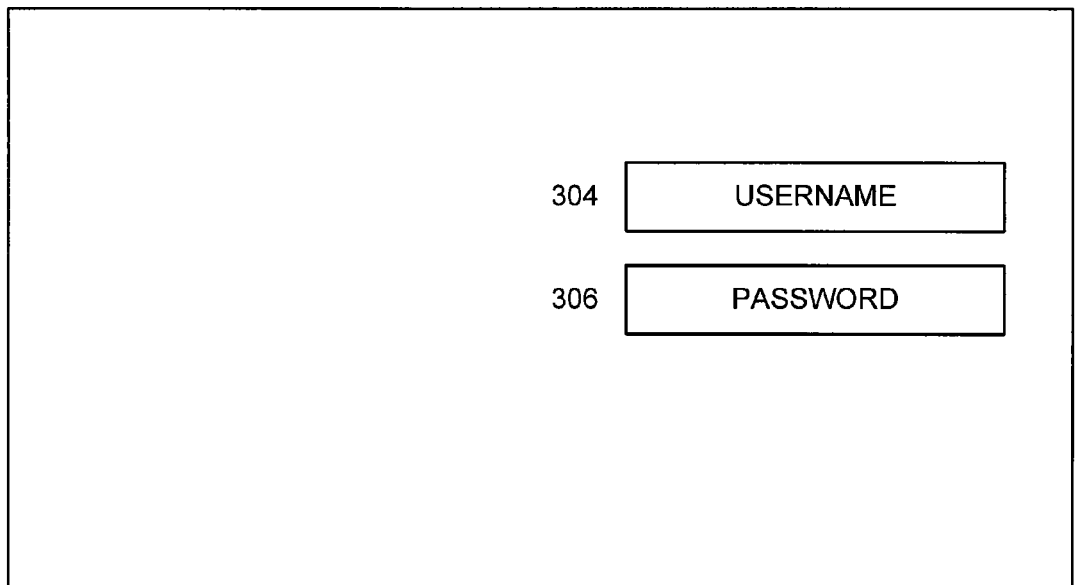
FIG. 3A shows a high-level schematic of a Home Page.
Figure 3B:
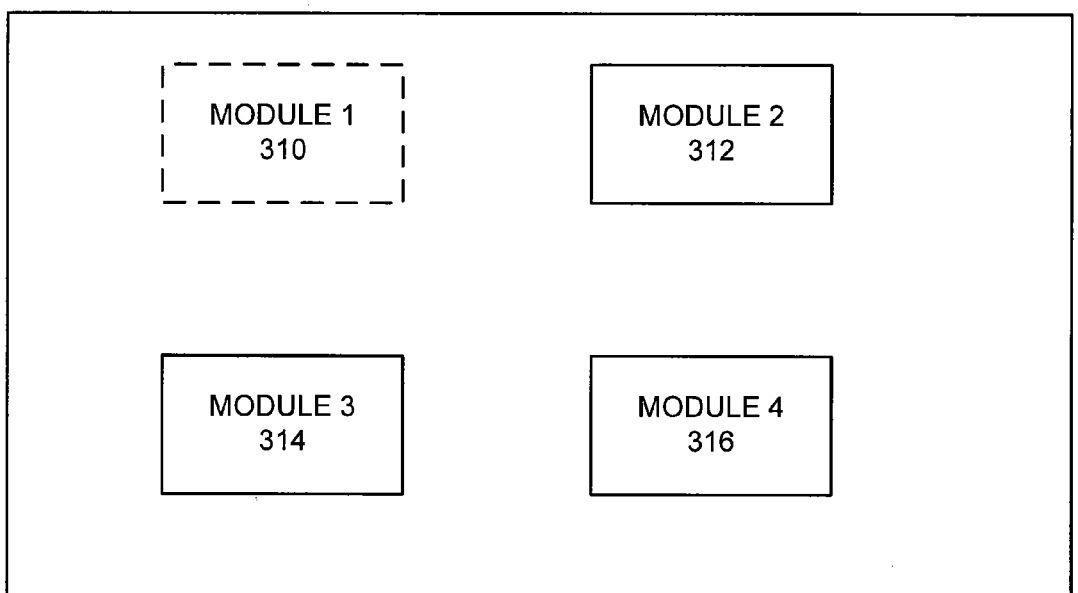
FIG. 3B shows a high-level schematic of a Menu Page.
Figure 3C:
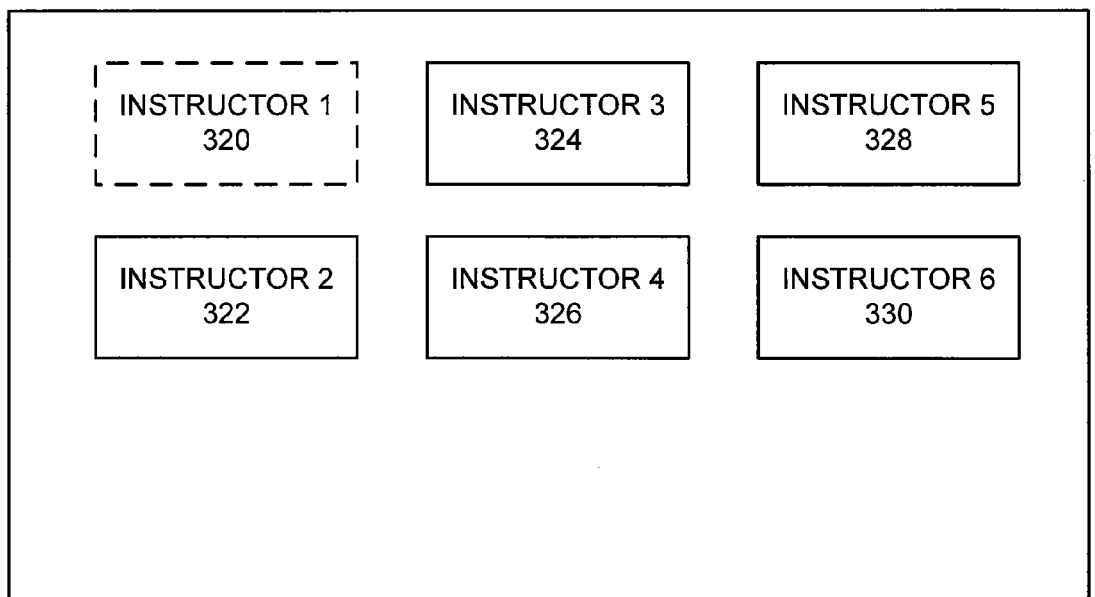
FIG. 3C shows a high-level schematic of an Instructor Selection Page.
Figure 3D:
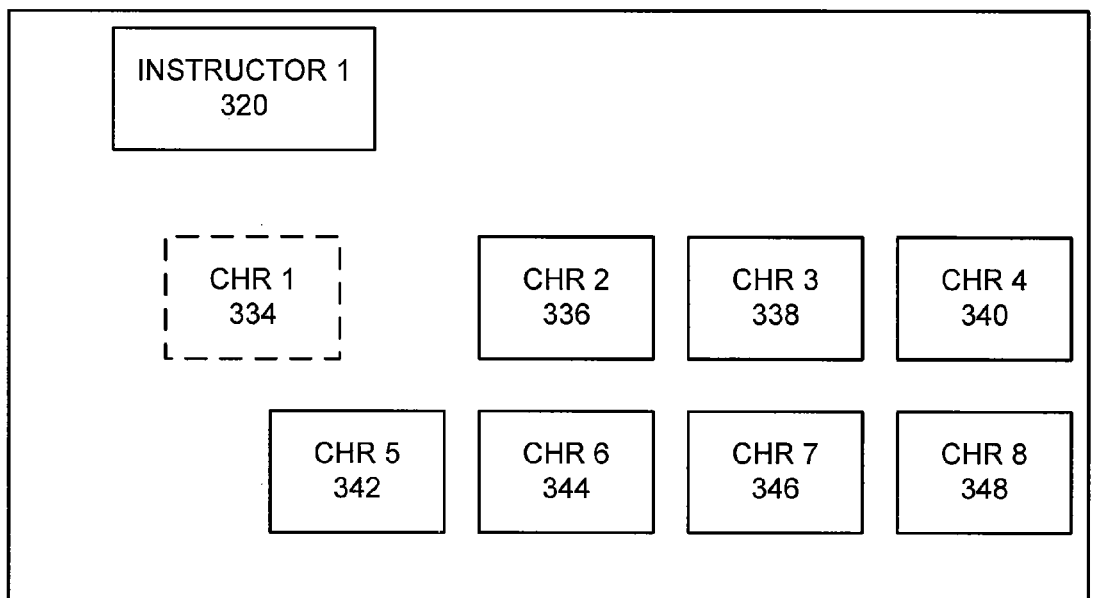
FIG. 3D shows a high-level schematic of a User Selection Page.

In an embodiment of the invention, AS 142 hosts a computer-based tutoring system (CBTS). Herein, a computer-based tutoring system is also referred to as an electronic tutoring system. An embodiment of a computer-based tutorial session is shown in FIG. 3A-FIG. 3E. User US 122 opens a web browser on PC 202 and accesses the website of the CBTS. FIG. 3A is a schematic representation (screen) of the Home Page 302 viewed by US 122 on video display 216. Home Page 302 presents two fields: Username 304 and Password 306. User US 122 enters his username and password via keyboard 220 and proceeds to the Menu Page 308 (FIG. 3B), which presents multiple modules, such as Module 1 310-Module 4 316. Herein, a module refers to a topic, subject, lesson, or tutorial; for example, algebra, geometry, precalculus, and test tricks. One skilled in the art may develop modules for any subject matter. In addition to general education courses such as math, science, English, history, geography, and foreign languages, embodiments of the invention may be used to provide computer-based training for subjects such as, but not limited to, assembly, operation, and repair procedures for machinery; home repair and improvement; cooking; and gardening. Module 1 310-Module 4 316 are represented by graphical images, including audiovisual images (such as rotating spheres in space). Herein, audiovisual images include video images (images displaying motion) with accompanying sound.

User US 122 selects Module 1 310. For example, US 122 may use mouse 218 to position a cursor over Module 1 310 and select Module 1 310 by clicking on it. User US 122 then proceeds to Instructor Selection Page 318 (FIG. 3C), which presents multiple instructors (also referred to as tutors), such as Instructor 1 320-Instructor 6 330, which are represented by graphical images, including audiovisual images. In an embodiment of the invention, an instructor is represented by an animated cartoon character with a human voice synchronized to its movements. Herein, animated characters also include audiovisual images of actual people, animals, and objects. To foster a fun learning environment, which may be adapted to users of different ages and personal tastes, Instructor 1 320-Instructor 6 330 present different personae. For example, Instructor 1 320 is Jax, an animated upright, talking cat, and Instructor 2 322 is Roxy, an animated talking dog. Other instructors may include a hip-hop guy, a doctor, a military person, and various other animals.

Figure 3E:
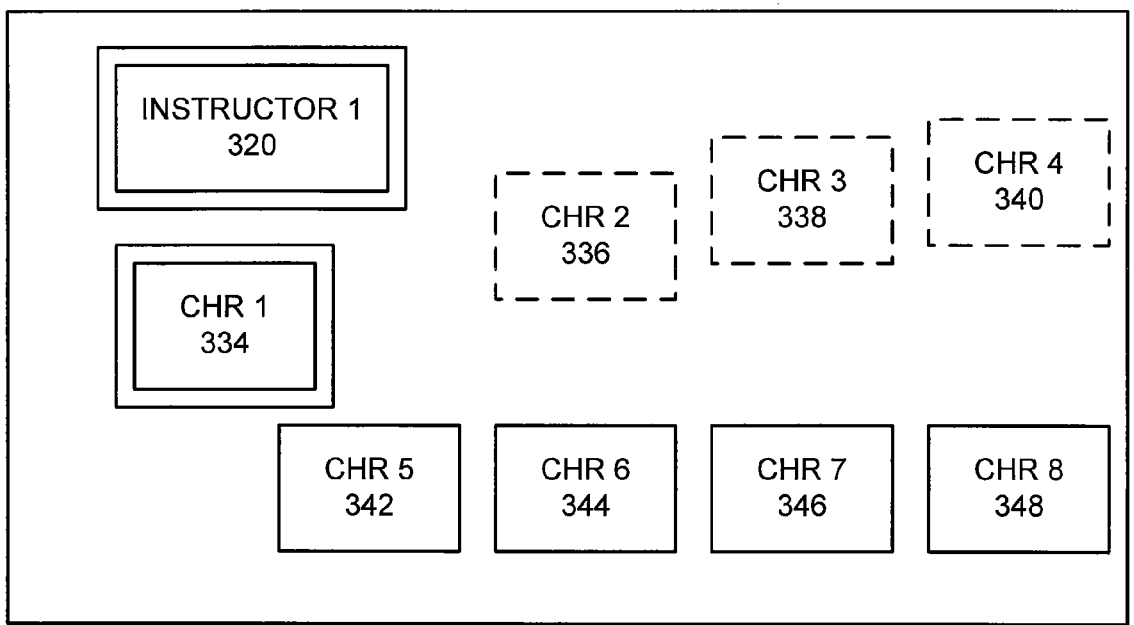
FIG. 3E shows a high-level schematic of a Group Selection Page.

User US 122 selects Instructor 1 320 and proceeds to User Selection Page 332 (FIG. 3D), which presents multiple characters, such as CHR 1 334-CHR 8 348, represented by graphical images, including audiovisual images, such as animated characters with synchronized human voices. Similar to the assortment of instructors, the multiple characters present various personae. User US 122 selects a character to represent himself; that is, his avatar. In the example shown, US 122 selects CHR 1 334 as his avatar and proceeds to Group Selection Page 350 (FIG. 3E). Other characters may be selected to serve as group members (classmates). In the example shown, US 122 selects CHR 2 336, CHR 3 338, and CHR 4 340 to be members of the group. As discussed below, members of the group may engage in dialogue with the instructor, the avatar, and with one another to assist the user in learning the subject matter.

Figure 4:
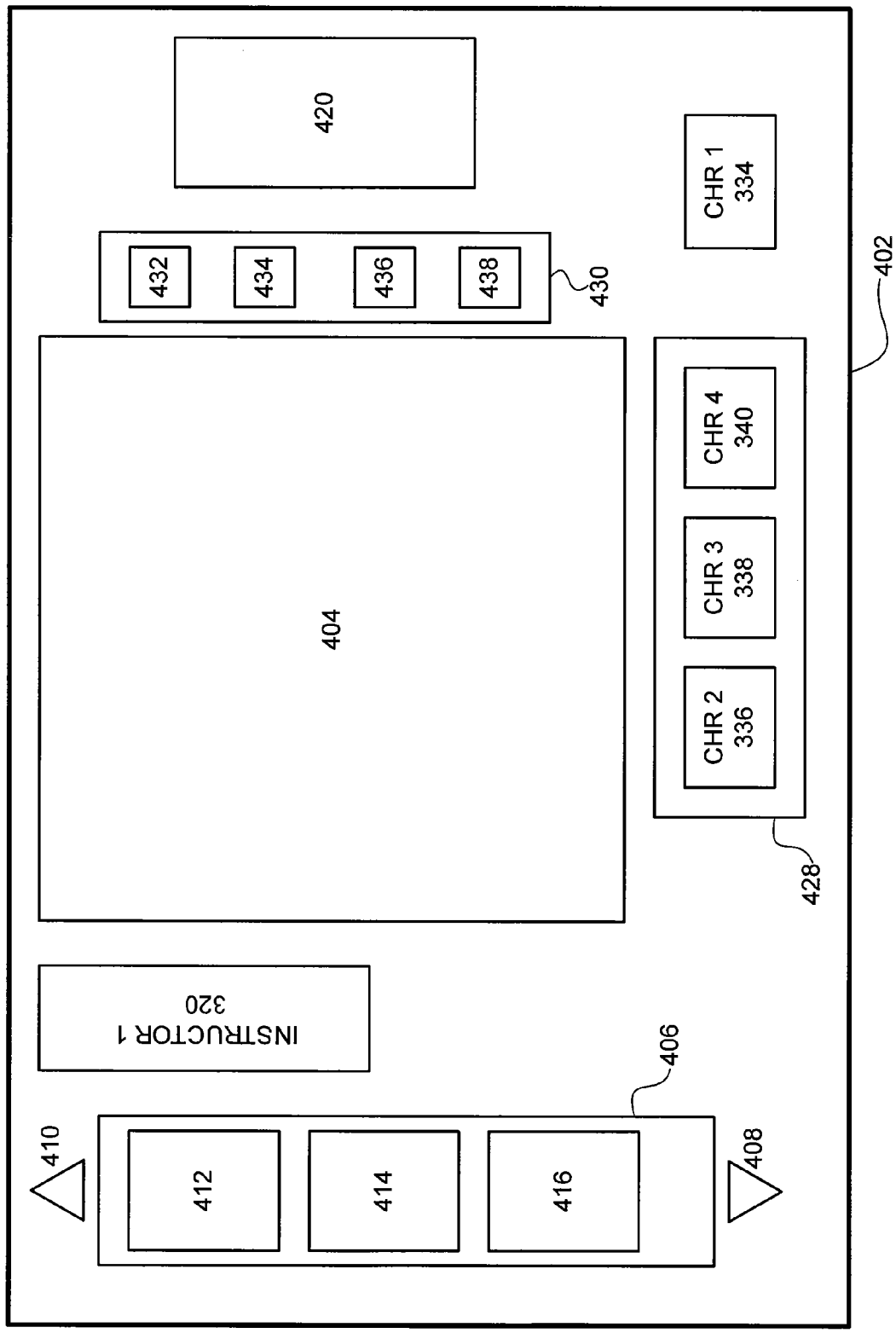
FIG. 4 shows a high-level schematic of a Working Page.

User US 122 then proceeds to Working Page 402 (FIG. 4), where the actual tutorial begins. User US 122 may choose to customize Working Page 402. Background colors and patterns (not shown) may be added, and the background patterns may be fixed or moving. For example, the background may be solid blue, solid gold, or pink with floating hearts. These options reinforce the comfort that US 122 experiences with the CBTS. Comfort is conducive to learning.

Instructor 1 320 and avatar CHR 1 334 are shown, along with group 428, comprising the previously selected group members CHR 2 336, CHR 3 338, and CHR 4 340. Instructor 1 320, avatar CHR 1 334, and group members CHR 2 336, CHR 3 338, and CHR 4 340 may occupy fixed positions, or may move about the Working Page 402. For example, Instructor 1 320 may approach and physically interact with avatar CHR 1 334 and group members CHR 2 336, CHR 3 338, and CHR 4 340. Working Page 402 presents additional fields: Working Box 404, Supplementary Box 406, Additional Information Box 420, and Control Box 430. Herein, Supplementary Box 406 is also referred to as Blue Box 406, and Additional Information Box 420 is also referred to as What Does this Mean? Box 420. These fields are described in further detail below.

Control Box 430 contains control button 432-control button 438, which control the flow of the tutorial. For example, control button 432-control button 438 may be used to pause, play, fast-forward, and rewind the tutorial (also referred to as a lesson). User 122 activates a control button by clicking on it. Each line in the tutorial is a particular track, analogous to the tracks on an audio compact disk (CD) or digital video disk DVD, and not a continuous feed. By operating control button 432-control button 438, US 122 may jump around the program according to his individual needs; thus, US 122 may learn 'at his own pace' (and repeat segments as many times as necessary). The program will automatically proceed from one track to the next. If, however, US 122 needs to review a particular subject matter, he may backspace (rewind) once, twice, or an arbitrary number of times to replay selected steps over and over again until he has learned the material. User US 122 may also pause the program for various reasons: to reflect more deeply on the subject matter, to work on some problems on paper off on the side, or simply to take a break. If US 122 is reviewing a particular module, but has a good understanding of it already, he may skip ahead to use study time more effectively.

As the tutorial is presented, with the animated cartoon Instructor 1 320 teaching to both US 122, represented by avatar CHR 1 334 and members of group 428, graphics are presented in Working Box 404 for visualization of the subject being taught. Graphics may be still, animated, or video. The graphics may be accompanied by audio, such as voice or music. Every time a fundamental subject matter (also referred to as a key feature) is presented (for example, a theorem, an important rule, or a relevant diagram), a small graphical representation of the fundamental subject matter appears as a field in Blue Box 406. As the materials are being presented, additional fields (containing key formulas, theorems, and facts, for example) are presented in Blue Box 406. In the example shown in FIG. 4, three fields, field 412, field 414, and field 416, are shown in Blue Box 406. Additional fields may be displayed in Blue Box 406 via use of scroll key 408 and scroll key 410. User US 122 may quickly refer to specific subject matter by viewing a field in Blue Box 406. In an embodiment of the invention, US 122 may click on a field, such as field 412, in Blue Box 406, and the program will return to the spot (time) in the program in which the field was first introduced.

Additional information may be provided in the What Does This Mean? Box 420. When US 122 is studying a specific module, ideally he should know and understand the requisite terms which are necessary to proceed with the instruction. In some instances, however, US 122 may not know and understand specific terms. In an embodiment of the invention, when a key word or key phrase occurs during the tutorial (for example, it may be spoken by Instructor 1 320 or appear in Working Box 404), then the key word or key phrase is displayed in the What Does This Mean? Box 420. Diagrams or pictures pertaining to the key word or key phrase may also be presented. If US 122 desires additional information, he may click on the key word, key phrase, corresponding diagram, or corresponding picture. Additional information is then provided in the What Does This Mean? Box 420. The additional information, for example, may be displayed as text or graphical images (including audiovisual images). Suggestions and recommendations for further study, including pointers and links to other modules, may also be provided.

In some embodiments, US 122 may also click on a key word, key phrase, corresponding diagram, or corresponding picture in Working Box 404 or Blue Box 406 to receive additional explanatory information in What Does This Mean? Box 420.

In some embodiments, in addition to key words and phrases, an index button (not shown) may be displayed either in the What Does This Mean? Box 420, or somewhere in the vicinity of the What Does This Mean? Box 420. At any time, US 122 may click on the index button to activate a hyperlink directly to an index of all terms relating to the subject of interest. For example, for the mathematics project, the index lists all terms relating to mathematics, whether the term is from the Algebra, Geometry, Precalculus, or the Test Tricks sphere of topics. Clicking on any particular word or phrase in the index takes US 122 to a list of modules the program may suggest he visit, as well as provide a definition (or definitions) of the term or phrase that US 122 clicked on.

Figure 5B:
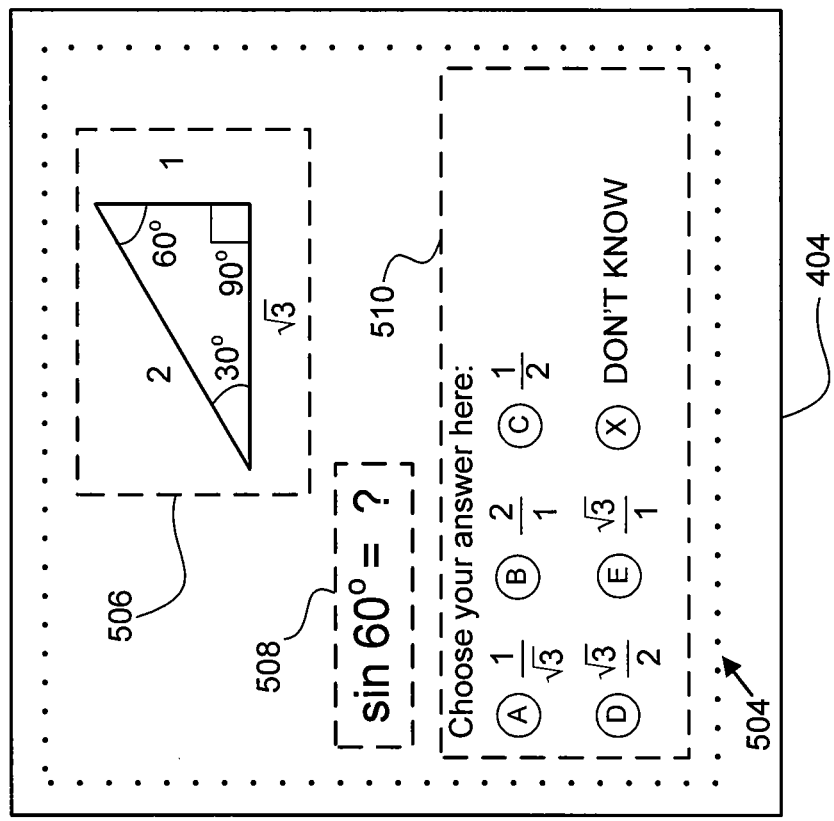
FIG. 5A and FIG. 5B show examples of content in a Working Box.
Figure 5A:
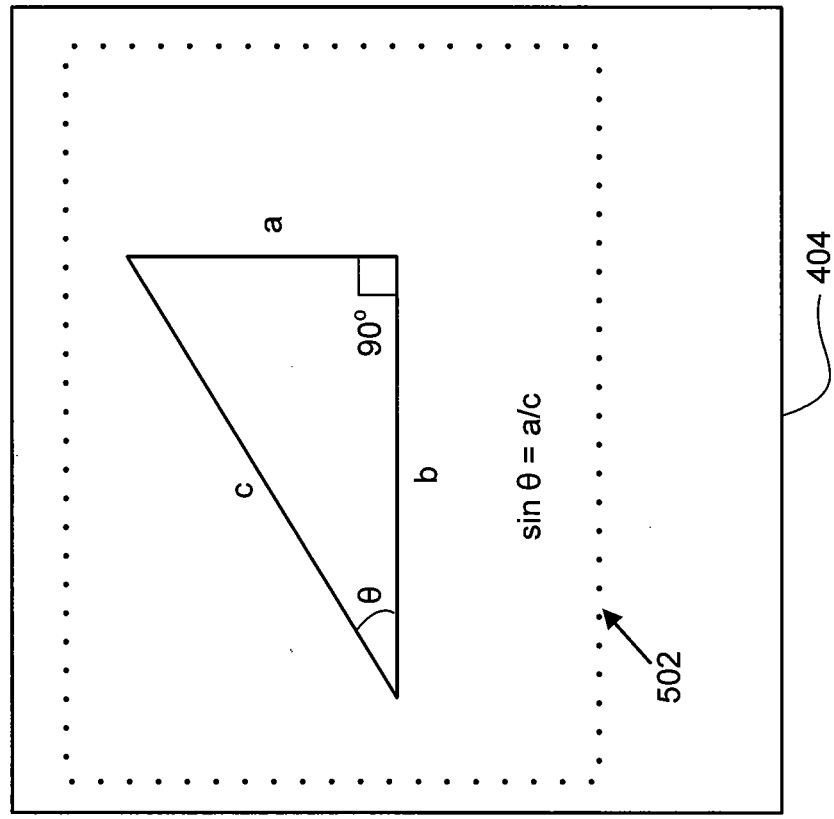

Examples of content displayed in Working Box 404 are shown in FIG. 5A and FIG. 5B. In FIG. 5A, content 502 displays an image of a triangle while Instructor 1 320 is explaining the calculation of the sine of an angle. In FIG. 5B, content 504 displays a test session. Field 506 presents a sketch associated with the problem (in this example, a right triangle). Field 508 presents the question (in this example, "What is the sine of 60 degrees?"). Field 510 presents the possible answers (labelled A-E). User 122 selects an answer by clicking on one of A-E (or X, "Don't Know").

Figure 6:
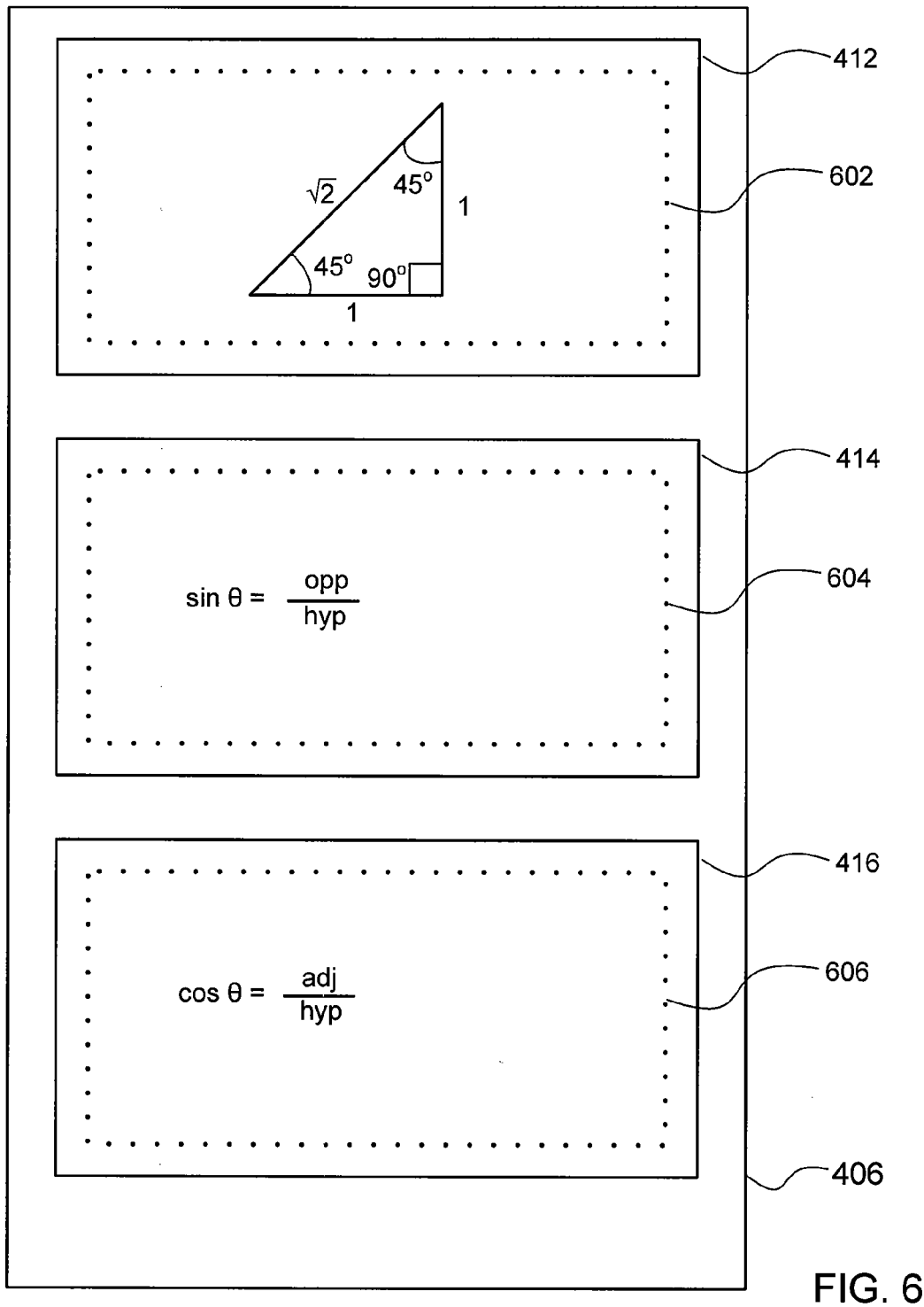
FIG. 6 show examples of content in a Blue Box.

Examples of content displayed in Blue Box 406 are shown in FIG. 6. Content 602 in field 412 is a sketch of a 45-45-90 degree triangle showing the relationship of the lengths of the sides. Content 604 in field 414 shows the formula for calculating the sine of an angle. Content 606 in field 416 shows the formula for calculating the cosine of an angle. If US 122 wishes to return to the point (time) in the program in which the formula for calculating the sine of an angle was first introduced, he may click on field 414.

Returning to FIG. 4, Instructor 1 320 teaches to avatar CHR 1 334 and group 428. According to an embodiment of the invention, Instructor 1 320 holds a dialogue with one or more members of group 428. Members of group 428 may also hold a dialogue among themselves. For example, Instructor 1 320 may hold a dialogue (one or two way) with group member CHR 2 336, and group member CHR 3 338 may hold a dialogue with group member CHR 4 340. Dialogues between animated characters allow for the instruction to invoke the powerful teaching tool of question and answer with real "living" characters. Specific group members may be selected by US 122 or by the program.

According to embodiments of the invention, avatar CHR 1 334 may perform varying degrees of activity. Examples include the following:

Avatar CHR 1 334 may interact in a humorous manner with Instructor 1 320 and members of group 428. For example, avatar CHR 1 334 may walk over to members of group 428 and tease them or push them. Instructor 1 320 may then scold or reprimand avatar CHR 1 334. As another example, avatar CHR 1 334 may do a victory dance or spike down a football when US 122 gets an interactive question correct. He may, for example, also slap his forehead or look down when his answer is incorrect.

Avatar CHR 1 334 may hold a dialogue with Instructor 1 320. Avatar CHR 1 334 may hold a dialogue with one or more members of group 428. Specific group members may be selected by US 122 or by the program. A dialogue may include asking and answering questions.

Avatar CHR 1 334 may spontaneously make suggestions to the Instructor 1 320.

When US 122 clicks on an answer to an interactive question, avatar CHR 1 334 may click on the answer or speak the answer.

When items are being referenced in Working Box 404, avatar CHR 1 334 may point to them, move to them, touch them, or hold them.

At different times in the program, avatar CHR 1 334 may generate a list or menu of questions that US 122 may want to ask Instructor 1 320. The list, for example, may appear as a pop-up right next to avatar CHR 1 334. If US 122 clicks on a question, then the program may proceed into a subloop while Instructor 1 320 answers the question.

When US 122 gets an incorrect answer to an interactive question, avatar CHR 1 334 may ask Instructor 1 320 to explain why the answer is incorrect before the program proceeds into a subloop.

When Instructor 1 320 suggests to US 122 that he revisit another module, avatar CHR 1 334 may travel to the other module.

In an embodiment of the invention, US 122 controls the degree of activity of avatar CHR 1 334 by turning specific features and functions on/off (such as walking around, disrupting the class, and spontaneously asking questions).

Historically, whenever students (in classrooms, in one-on-one tutorials, and while viewing online tutorials, for example) are in the position of having to absorb more and more and more information that is being told to them, it is easy for them to feel drained and overwhelmed. When they are invited to think and figure things out, however, then they are more stimulated and therefore more receptive to absorbing the topics being presented. Factors which trigger a student to think and feel engaged include: (a) a comfortable environment (such as provided by the custom background on Working Page 402), (b) exposure to questions (even when the questions are not directed to the student, but to different characters on the screen), and (c) visual cues (for example, lines of a triangle "lighting up") which stimulate memory retention when next faced with a similar problem. Since the screen presents visible, animated, speaking characters arranged near Working Box 404, they can all engage in back-and-forth conversation, thereby asking each other questions that impel the student to think about these questions at the same time that the characters "are thinking" about them too.

While members of group 428 are interacting with one another and while the Instructor 1 320 is interacting with avatar CHR 1 334 and members of group 428, graphics that synchronize with the instruction are displayed in Working Box 404. As one example, if the Instructor 1 320 is speaking about angles opposite sides of a triangle, then triangles with animation will be displayed to illustrate the lesson: animated arrows will be drawn from an angle being referenced to the side opposite this angle.

As another example, if the Instructor 1 320 is discussing multiplying fractional expressions and how identical factors in the numerator and denominator of fractions can cancel, animated lines will cross through the cancelable factors. Whenever the Instructor 1 320 is referencing a particular object (such as a line, segment, or angle) in a diagram displayed in the Working Box 404, the object glows with increasing and decreasing intensity, similar to a blinking light which draws the attention of US 122 to the referenced object.

As another example, if the Instructor 1 320 is discussing folding an equilateral triangle in half to become a 30°-60°-90° triangle, displayed in the Working Box 404 is an animated equilateral triangle actually folding in half, or the bottom half dissolving away, to reveal the remaining 30°-60°-90° triangle. Thus, the use of moving, folding, dissolving, highlighting, shifting, rotating, compressing, dilating, pulsating, and other dynamic actions of figures and script in the Working Box 404, along with the use of dynamic pointers (such as bouncing arrows) by the Instructor 1 320, members of group 428, and avatar CHR 1 334, capture the attention of US 122 and help him observe what is being referenced at any particular moment in the program. All these actions may be synchronized with the vocal instruction of the Instructor 1 320 and with the voices of members of group 428.

Custom (unique) teaching methods are presented for each specific subject (such as mathematics, physics, chemistry, and test taking techniques). An example of a custom teaching method is described below for an algebra problem.

In attempting to factor a quadratic expression, such as $(240x^2+8x-45)$, a Rule ("Factoring Rule") and a Guideline ("un-FOIL-ing Guideline") are presented to a student.

"Factoring Rule": The Factoring Rule states that if an original polynomial, such as $(240x^2+8x-45)$, is not "GCF-able", then none of the polynomial's factors is GCF-able either. "GCF-able" means that a greatest common factor (GCF) can be factored out. Hence, an attempt to factor out the original polynomial $(240x^2+8x-45)$ to $[(24x+9)(10x-5)]$ is guaranteed to fail. Given that the original polynomial $(240x^2+8x-45)$ cannot have a GCF taken out of it (hence, it is not GCF-able), then none of its factors can have a GCF factored out either. However, both $(24x+9)$ and $(10x-5)$ are GCF-able: a 3 can be factored out of $(24x+9)$, and a 5 can be factored out of $(10x-5)$. Therefore, the original expression cannot possibly have these GCF-able factors. Such factors should not even be written down for testing, given that they are guaranteed to fail. This rule significantly eliminates the number of possibilities to test.

"un-FOIL-ing Guideline": If the absolute value of the linear term's coefficient is "relatively small" as compared to the absolute value of the product of the quadratic coefficient and the constant term, then the splits on the quadratic coefficient and the constant term are most likely small as well. If the absolute value of the linear term's coefficient is "relatively large" as compared to the absolute value of the product of the quadratic coefficient and the constant term, then the splits on the quadratic coefficient and the constant term are most likely large as well.

Applying the Guideline to the polynomial $(240x^2+8x-45)$ yields the following results: (a) The factors/splits on 240 are 1*240, 2*120, 3*80, 4*60, 5*48, 6*40, 8*30, 10*24, 12*20, 15*16. (b) The factors/splits on 45 are 1*45, 3*15, 5*9. Consequently, the possible factors of $(240x^2+8x-45)$ are numerous. For the 10 possible splits on the 240, and the 3 possible splits on the 45, there are then 10*3 or 30 different combinations of numbers. Some of the combinations are listed below:

(1x+1)(240x−45)
(1x+3)(240x−15)
(1x+5)(240x−9).

Note that, keeping the 1x and 240x in the same position, the 45 splits may be switched:

(1x+45)(240x−1)
(1x+15)(240x−3)
(1x+9)(240x−5).

Therefore, the 30 possibilities now doubles and becomes 60. For any given possible factoring to test [(1x+45)(240x−1), for example], the plus/minus signs may be switched around: [(1x−45)(240x+1)]. As a result, the 60 possibilities now doubles to be 120 possibilities. In summary, there are 120 possible combinations of these factors that the student would have to simplify ("FOIL" out) to see which ones work. The "un-FOIL-ing Guideline", however, may identify factors that are most likely to work, and these should be tested first.

Recall the splits on the 240 and the 45:

| 240 | 45 |
|---|---|
| 1 * 240 | 1 * 45 |
| 2 * 120 | 3 * 15 |
| 3 * 80 | 5 * 9 |
| 4 * 60 | |
| 5 * 48 | |
| 6 * 40 | |
| 8 * 30 | |
| 10 * 24 | |
| 12 * 20 | |
| 15 * 16. | |

Now look at the original quadratic $(240x^2+8x-45)$ and recall the "un-FOIL-ing Guideline": If the absolute value of the linear term's coefficient is "relatively small" as compared to the absolute value of the product of the quadratic coefficient and the constant term, then the splits on the quadratic coefficient and the constant term are most likely small as well. In other words, how does 8 compare to 240*45? It's much MUCH smaller, isn't it? And so if this number is "small" compared to 240*45, then that means the splits on the 240 and 45 are most likely small splits (15*16 and 5*9). These are called "small splits" because there is not much difference between the 15 and the 16, and not much difference between the 5 and the 9.

Therefore, the expression $(240x^2+8x-45)$ most likely factors out to be either:
- (15x+5)(16x-9), or
- (15x+9)(16x-5), or
- (15x-5)(16x+9), or
- (15x-9)(16x+5).

Recall the Factoring Rule, however: If an original polynomial, such as $(240x^2+8x-45)$ is not "GCF-able" [that is a GCF (Greatest Common Factor) cannot be factored out], then none of the polynomial's factors is GCF-able either. Then that means every one of the listed factors is impossible, given that each expression has at least one factor which is GCF-able:
- (15x+5)(16x-9)←the 15x & 5 from the first set of parenthesis, a 5 can be factored out;
- (15x+9)(16x-5)←the 15x & 9 from the first set of parenthesis, a 3 can be factored out;
- (15x-5)(16x+9)←the 15x & 5 from the first set of parenthesis, a 5 can be factored out;
- (15x-9)(16x+5)←the 15x & 5 from the first set of parenthesis, a 3 can be factored out.

Hence, these should not even be tested, given that they are guaranteed to fail. The student should know to not even bother writing them down.

Reviewing the list of the splits on the 240 and the 45, we have:

| 240 | 45 |
|---|---|
| 1 * 240 | 1 * 45 |
| 2 * 120 | 3 * 15 |
| 3 * 80 | 5 * 9 |
| 4 * 60 | |
| 5 * 48 | |
| 6 * 40 | |
| 8 * 30 | |
| 10 * 24 | |
| 12 * 20 | |
| 15 * 16. | |

Next most likely would be the 12*20 split on 240 with the 5*9 split on the 45. Possible combinations yield:
- (12x+5)(20x-9), or
- (12x+9)(20x-5), or
- (12x-5)(20x+9), or
- (12x-9)(20x+5).

Of course, two of these are impossible, the $2^{nd}$ and $4^{th}$ ones listed:
- (12x+5)(20x-9),
- (12x+9)(20x-5)←the 12x & 9 from the first set of parenthesis, a 3 can be factored out,
- (12x-5)(20x+9),
- (12x-9)(20x+5)←the 12x & 9 from the first set of parenthesis, a 3 can be factored out.

Hence, the only 2 possibilities with these splits are [(12x+5)(20x-9)] and [(12x-5)(20x+9)]. Multiplying both of them out (through the method algebra students know as "FOIL-ing") yields the following:

(12x+5)(20x-9) becomes $240x^2-8x-45$.

This is not correct, given that the middle term here is −8x and it should be +8x. The signs may then be simply switched around:

(12x-5)(20x+9) becomes $240x^2+8x-45$, and this correct. This means that although there are 120 possible factors to list out, every one to be potentially checked (by simplifying through FOIL-ing), this "monster" quadratic was factored in just the $2^{nd}$ try.

The overall presentation of the CBTS is the integration of character-cartoon animation synchronized with two-dimensional (2-D) animated graphics of text and diagrams in the Working Box 404. At times, however, video clips may be spliced into the presentation. These clips, for example, may explain how Mathematics and Science has applications to the "real world." This method not only reinforces in the concepts taught in each module by showing how they apply beyond the textbook, but the inclusion of video offers yet one more element of variety that keeps students attentive and entertained.

Another example of the unique teaching methods of CBTS is the theatrical video splice of an actor playing the part of John Napier, a Scottish Mathematician who devoted a large bulk of his life to the development of the Logarithm in the early 1600's. Depicted is a Scottish man dressed in the garb of that era, discussing the difficulties in finding exponents in certain equations. This scene, of course, provides a segue for the Instructor to introduce Logarithms as he actually engages in conversation through some odd time warp with John Napier of yesteryear. This type of interaction has multiple benefits: (1) It shows the origin of mathematical and scientific ideas, thereby allowing students to gain a keener interest in the subject they are studying. (2) It's fun theatrics, and what is fun is easier to learn.

The questions that Instructor 1 320 asks include two types: internal questions and interactive questions. Internal questions are questions that are asked by Instructor 1 320, avatar CHR 1 334, or a member of group 428 and then answered immediately by Instructor 1 320, by avatar CHR 1 334, or by one or more members of group 428. This process, again, invokes the student's instinct to think about the particular questions, as well as the topic in general, given that it feels to the student as if he were being asked the questions directly.

When Instructor 1 320 asks an interactive question, the question appears in written form in Working Box 404, along with several written answer choices, labeled A, B, C, etc., depending on how many answer choices there are. An example is shown in FIG. 5B. User US 122 then has to click on one of the answer choices. Typically, one of them is the correct answer; in some instances, though, there may be more than one right answer. Some embodiments may also include a standing response X, such as "Don't Know". In an embodiment of the invention, questions may also be asked by one or more members of group 428.

If US 122 clicks on the correct answer, Instructor 1 320 may congratulate US 122 (by exclaiming, "That's right!", for example). Instructor 1 320 may also respond with a more in-depth comment (for example: "Yes, and the reason for this is . . . . "). The program then continues onward. If US 122, however, clicks on one of the wrong answers, or on the "I don't know" response, then the program does one of two things: (a) It goes into a reminder subloop or (b) It provides a link to a different module within the CBTS. The reminder subloop is an explanation of a specific idea. The reminder subloop incorporates all of the features of the main presentation, such as animation, graphics, and interactive dialogue. A reminder subloop is not as thorough as the full treatise that US 122 experiences when he logs into the relevant module. The reminder subloop, however, is sufficient to trigger the recall and understanding of what he had learned previously.

An example of a session is presented herein. User US 122 logs onto the Trigonometry Module and learns how to find the sine, cosine, and tangent of angles such as 120°, 135°, and 210°. To do this, he needs to reference the 30°-60°-90° and 45°-45°-90° triangles he learned in the Geometry Module. If, however, US 122 has not retained his knowledge of these triangles, this shortcoming will be addressed by virtue of the fact that Instructor 1 320 will ask pertinent questions about the triangles. If US 122 answers these questions correctly, then the program proceeds with the explanation of trigonometric angles. If US 122 does not answer the questions correctly, however, then the program will take him into a subloop that explains the origin of the sides and angles of 30°-60°-90° and 45°-45°-90° triangles. This reminder subloop is not the thorough treatise that US 122 receives when he logs onto the section about 30°-60°-90° and 45°-45°-90° triangles from the Geometry Module.

In an embodiment of the invention, within subloops are further subloops of subloops, and subloops of subloops of subloops, etc. Consider the previous example of trigonometric angles and the 30°-60°-90° and 45°-45°-90° triangles. If US 122 answers one of the trigonometric questions incorrectly, he is led into the conditional subloop on 30°-60°-90° triangles as a result. Within this subloop, there will be other interactive questions that Instructor 1 320 asks US 122. One of the interactive questions, for example, deals with the Pythagorean Theorem. If US 122 incorrectly answers an interactive question about the Pythagorean Theorem, the program will automatically (without explicit action on the part of US 122) enter into a sub-subloop on radicals. Within this sub-subloop, there are questions involving perfect squares. If US 122 responds to these questions incorrectly, the program will automatically take him into a sub-sub-subloop on the topic of perfect squares.

Once US 122 understands the concept of perfect squares (by answering interactive questions correctly or going through several exercise loops successfully), the program will automatically come out of this sub-sub-loop on perfect squares, and pick up where it left off on the sub-subloop of radicals. Once US 122 answers the questions on radicals correctly, the program then automatically comes out of this sub-subloop on radicals back to the original Pythagorean Theorem question that appeared in the subloop on 30°-60°-90° triangles. And once US 122 answers the interactive questions regarding 30°-60°-90° triangles correctly, the program then automatically comes out the 30°-60°-90° triangles subloop and enters back into the module originally selected; in this example, trigonometric angles.

In an embodiment of the invention, US 122 may turn off conditional subloops. User 122 may also turn off interactive questions. Turning off one or both of these features permits US 122 to get an initial overview of the module or to review the main points. User US 122 may also skip an individual interactive question by clicking on the forward control button (for example, control button 432 in FIG. 4), instead of responding to it.

If US 122 repeatedly responds incorrectly to the interactive questions asked in the selected main module, as well as to the questions in the subloops and sub-subloops, etc., of the selected main module, then the artificial intelligence of the CBTS intervenes. After "x" number of incorrect responses in a row, the program suggests to US 122 that he go back and review other prerequisite modules before continuing with the present module. A link to these modules is provided on the screen. Note that "x" may be specified by the CBTS developer or administrator. The value "x" may be different for each interactive question. The CBTS session thereby provides a dynamic interaction similar to one provided by a private tutor working with a student who constantly answers incorrectly the questions the tutor is asking. The tutor might suggest going back and reviewing previous topics (that were taught earlier in the school year, or in previous math or science courses) instead of attempting to move onward with the current discussion.

Embodiments of scripts for tutorials in trigonometry are shown in FIG. 11A-FIG. 11I (Trig 000 Series Script); FIG. 12A-FIG. 12C (Trig 100 Series Script); FIG. 13A-FIG. 13B (Trig 500 Series Script); and FIG. 14A-FIG. 14D (Trig 900 Series Script). One skilled in the art may develop scripts for tutorials in any subject matter. In addition to general education courses such as math, science, English, history, geography, and foreign languages, embodiments of the invention may be used to provide computer-based training for subjects such as assembly, operation, and repair procedures for machinery; home repair and improvement; cooking; and gardening. The scripts are interrelated by the flowchart shown in FIG. 7A-FIG. 7G. The individual segments of the flowchart are registered by Index 1-Index 7. Inside each block are the line numbers (LXXXXX) corresponding to the line numbers in the scripts. Trig 000 Series Script (FIG. 11A-FIG. 11I) spans lines L00000-L00960. Trig 100 Series Script (FIG. 12A-FIG. 12C) spans lines L10010-L10280. Trig 500 Series Script (FIG. 13A-FIG. 13B) spans lines L50010-L50180. Trig 900 Series Script (FIG. 14A-FIG. 14D) spans lines L90010-L90430. One skilled in the art may develop specific scripts for specific applications (subjects). For a specific subject, one skilled in the art may develop different scripts (including different subloops and exercise loops). Alternative presentations may be developed to address the needs of different audiences (for example, one tutorial for engineers, another for marketing managers).

Figure 7A:
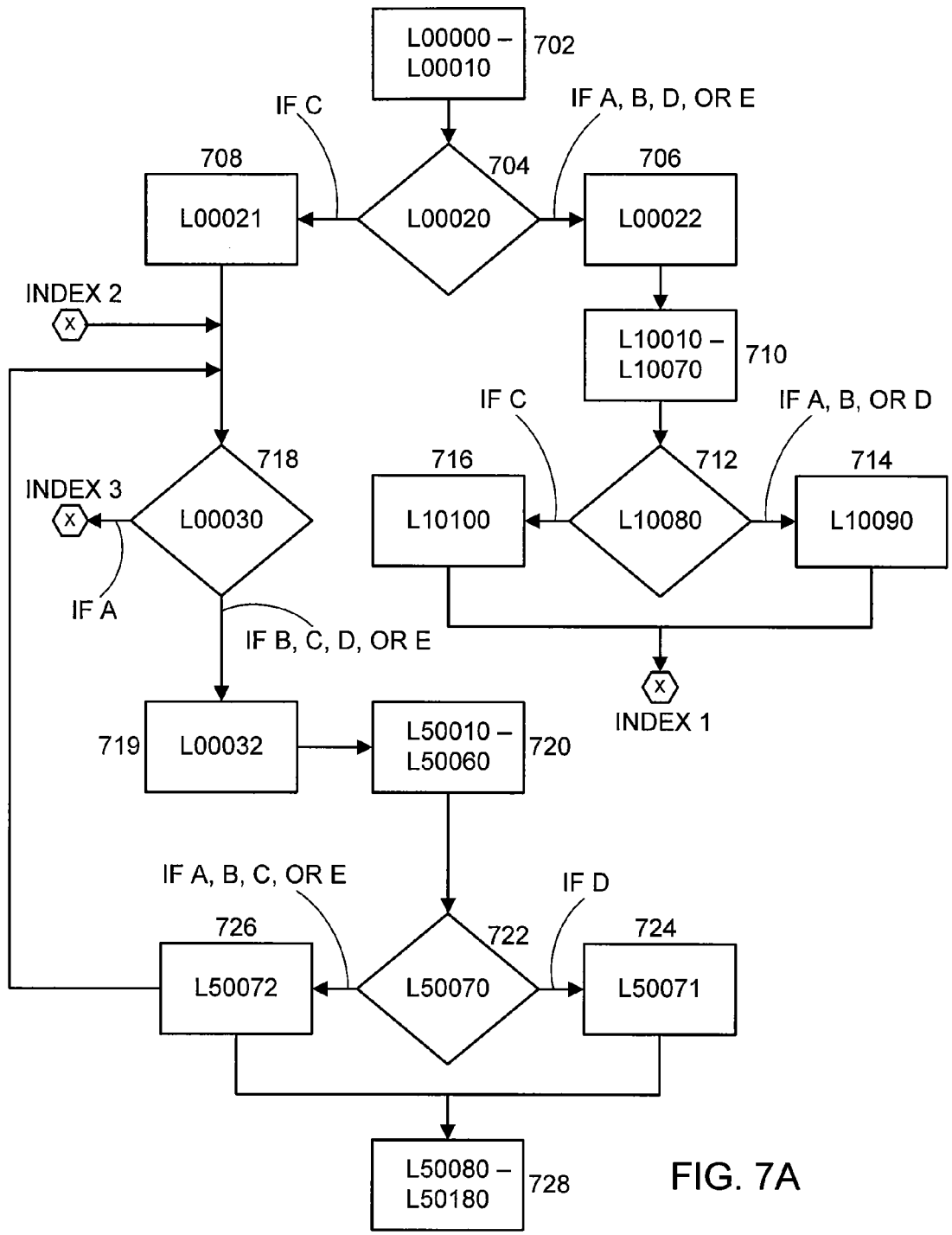
FIG. 7A-FIG. 7G show a flowchart of tutorial scripts.

The Trig 000 Series Script corresponds to the main module (in this instance, trigonometric angles). By default, a line is performed by the Instructor 1 320. If a line is performed by another character (such as a member of group 428 in FIG. 4), that character is explicitly identified. For example, line L00050 in FIG. 11A is performed by a character named Sgt. Gravis. Referring to FIG. 7A, the script starts at block 702, in which lines L0000-L00010 are performed. The script then passes to block 704. Line L00020 asks an interactive question about 30°-60°-90° triangles. Possible answers are presented as A, B, C, D, and E (see FIG. 5B for an example of a question and answer layout). In this example, C is the correct answer. If US 112 responds correctly (C), then the program proceeds to block 708, in which line L00021 is performed. The program then continues with the Trig 000 Series Script, block 718.

Figure 7B:
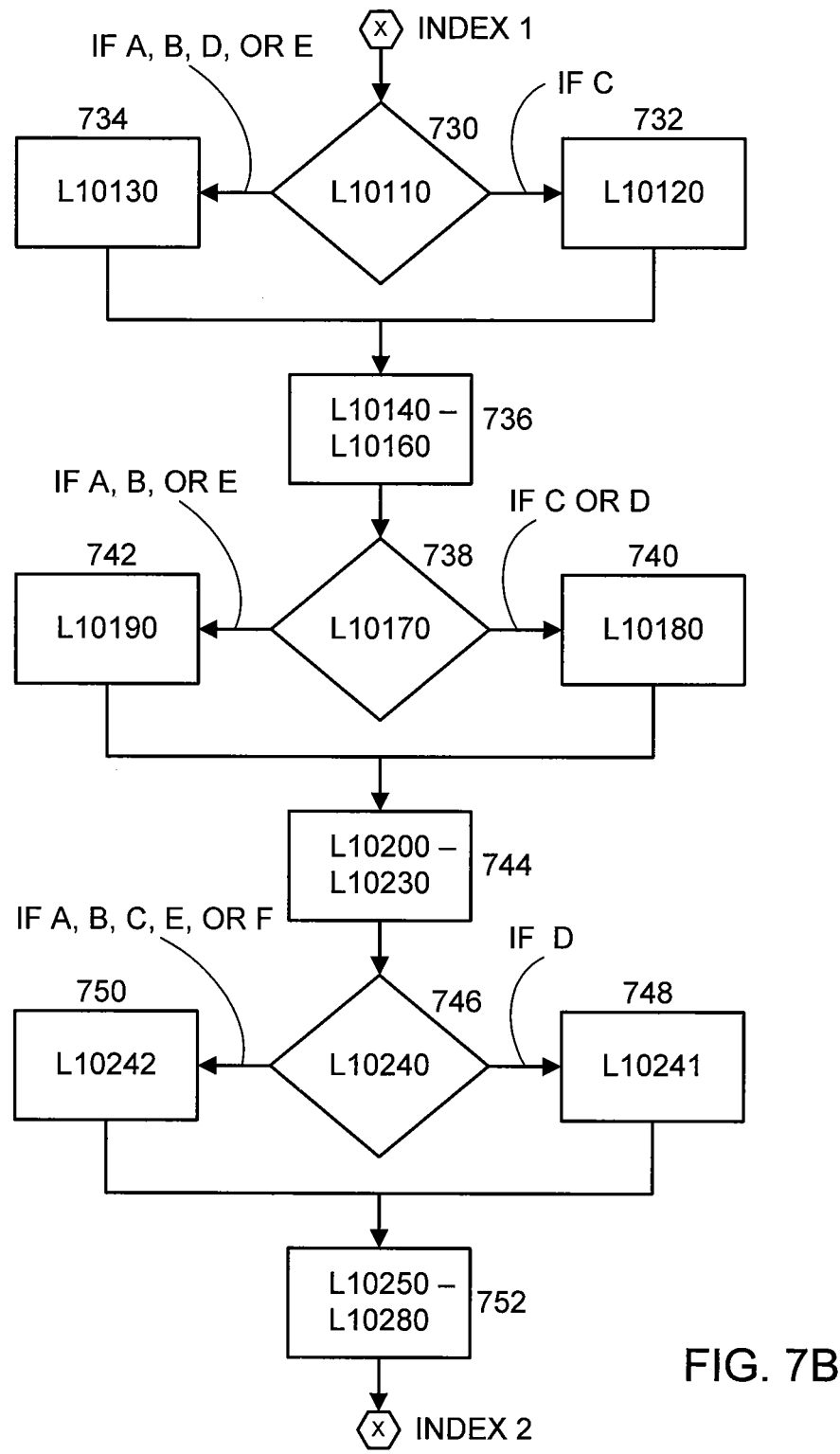

Referring back to block 704, if US 122 responds incorrectly (A, B, D, or E), then the program proceeds to block 706 in which line L00022 is performed. The program then passes into a subloop on 30°-60°-90° triangles. This subloop corresponds to the Trig 100 Series Script (lines L10010-L10280) performed in blocks 706, 710, and 712-716 (FIG. 7A) and in blocks 730-752 (FIG. 7B). Within the Trig 100 Series Script, there are interactive questions at line L10080 (block 712, FIG. 7A), line L10110 (block 730, FIG. 7B), line L10170 (block 738, FIG. 7B), and line L10240 (block 746, FIG. 7B). Once the Trig 100 Series Script has been completed (Line L10280, block 752, FIG. 7B), the subloop finishes, and the program returns to the main module (Trig 100 Series Script), block 718 (FIG. 7A).

Figure 7C:
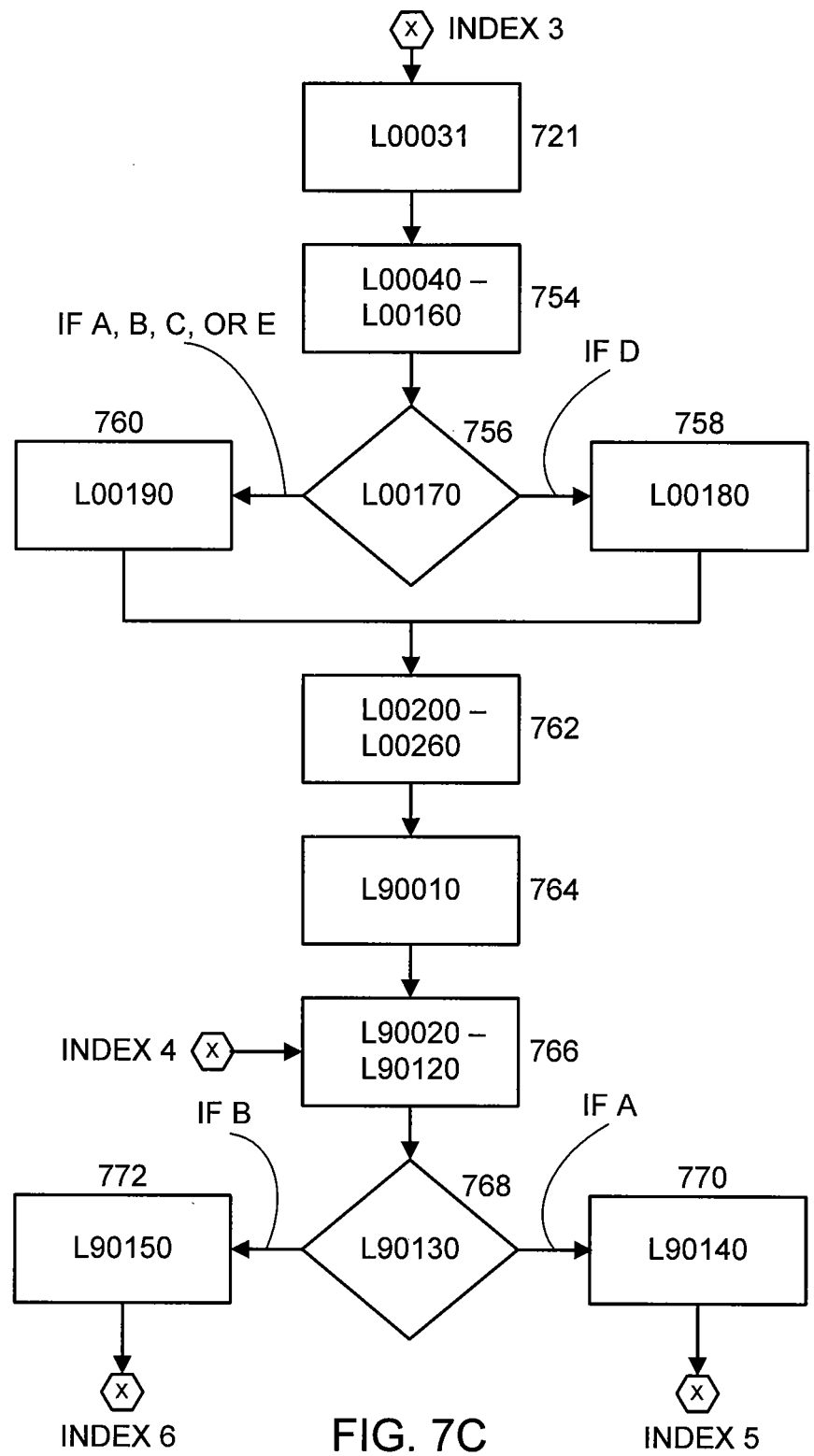
Figure 7D:
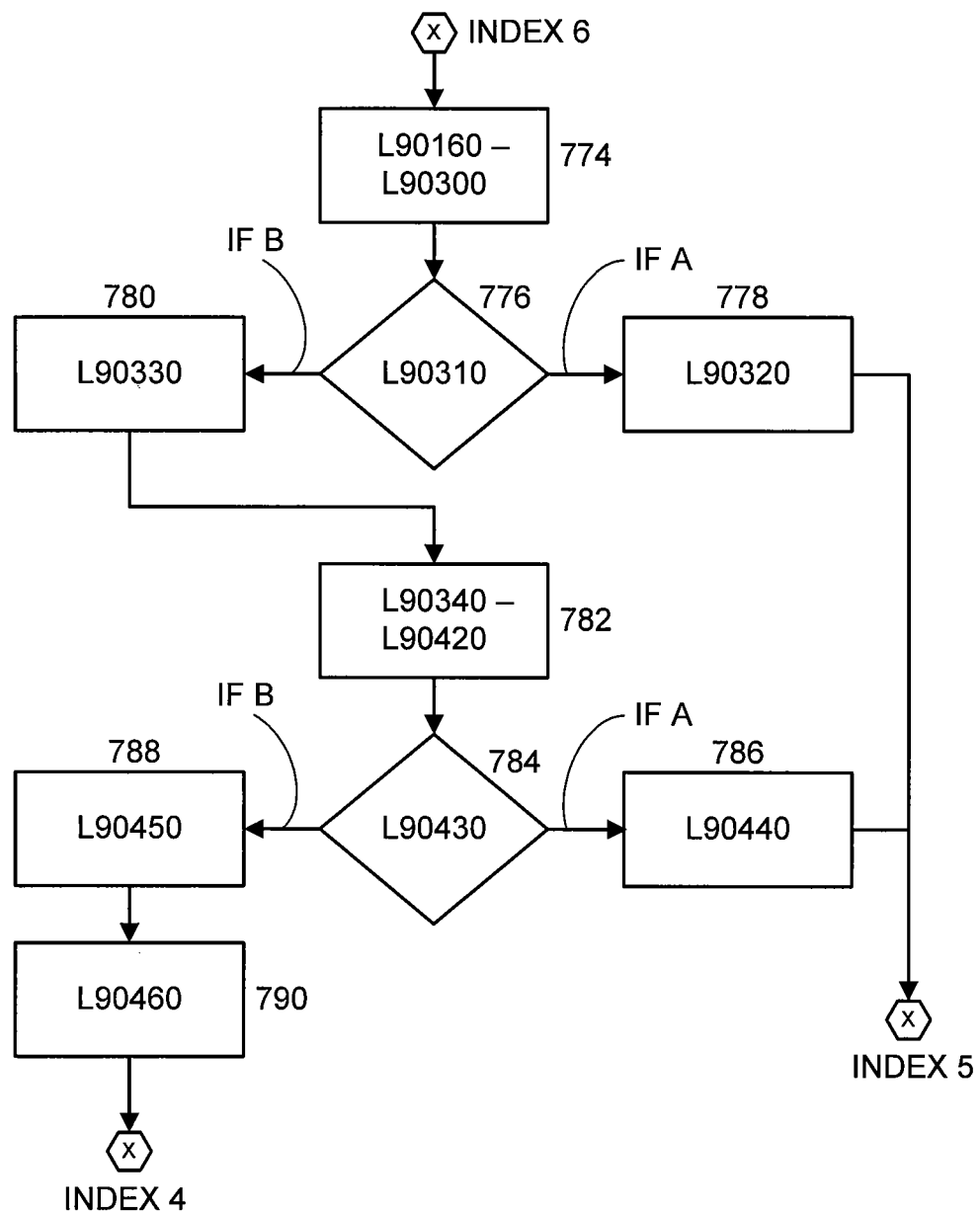

In block 718, an interactive question is asked at line L00030. If US 122 responds correctly (A), then the program continues with the Trig 000 Series Script, block 721 (FIG. 7C). If US 122 answers incorrectly (B, C, D, or E), then the program passes to block 719, in which line L00032 is performed, after which the program then passes into a subloop on 45°-45°-90° triangles. This subloop corresponds to the Trig 500 Series Script (lines L50010-L50060), performed in blocks 720-728. There is an interactive question at line L50070 (block 722). Once the Trig 500 Series Script has been completed (Line L50180, block 728), the subloop finishes, and the program returns to the main module (Trig 100 Series Script), block 718.

Figure 7E:
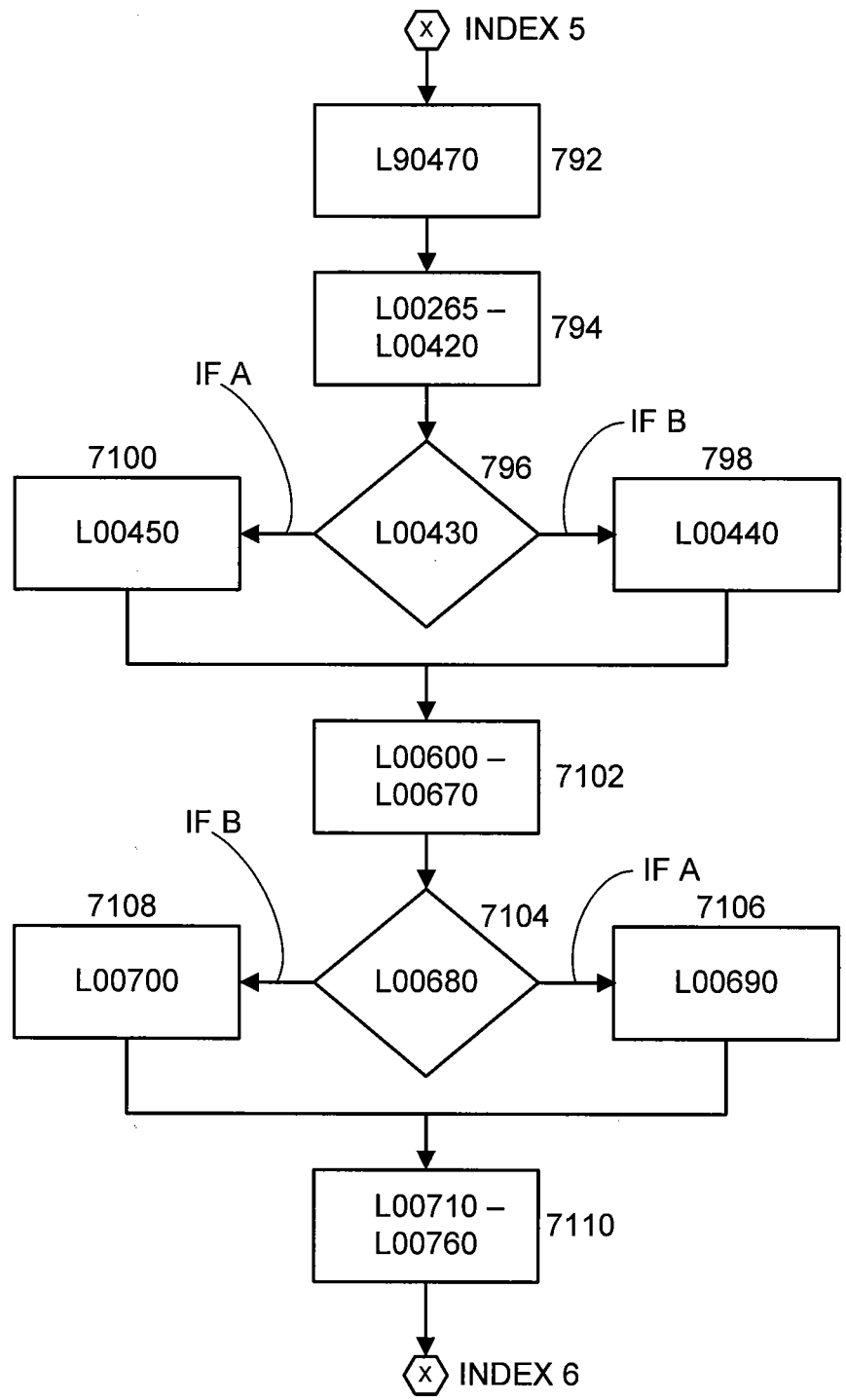
Figure 7F:
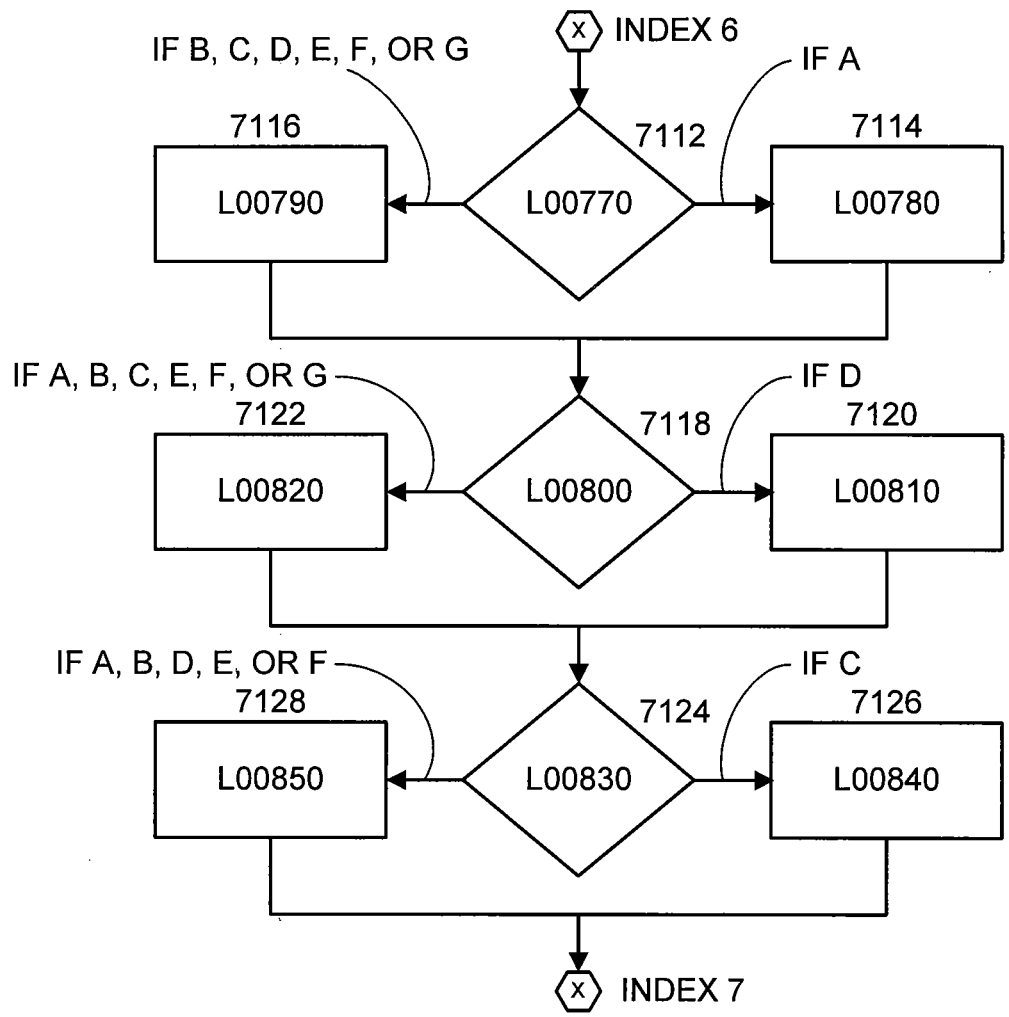
Figure 7G:
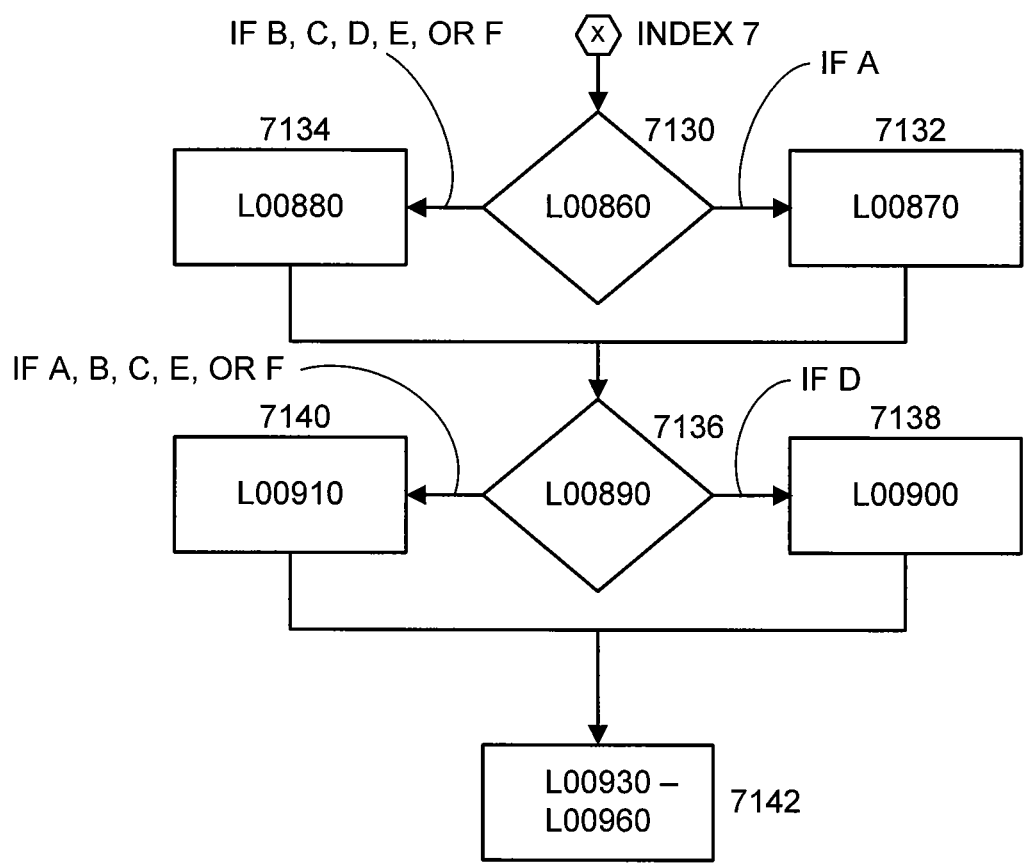

The program then proceeds to block 721 (FIG. 7C), in which line L00031 is performed. The program then passes to block 754, in which lines L00040-L00160 are performed. The program continues through blocks 756-762. There is an interactive question at line L00170, block 756. After line L00260 in block 762 has been performed, the program passes to an exercise loop. This exercise loop corresponds to the Trig 900 Series Script (lines L90010-L90430), performed in blocks 764-772 (FIG. 7C), blocks 774-790 (FIG. 7D), and block 792 (FIG. 7E). There are interactive questions at line L90130 (block 768, FIG. 7C), line L90310 (block 776, FIG. 7D), and line L90430 (block 784, FIG. 7D).

Both during and at the conclusion of the exercise loop, US 122 is given the option of repeating the entire exercise loop, or parts of the exercise loop, as often as he desires. US 122 is also given the option of skipping the exercise loop and the option of exiting the exercise loop (once the exercise loop has started) and continuing with the main dialogue on trigonometric angles (the Trig 000 Series Script).

Once the Trig Series 900 Script has been completed (line L90470, block 792, FIG. 7E), the program returns to the Trig 000 Series Script, block 794 (FIG. 7E). There are interactive questions at lines L00430 (block 796, FIG. 7E), L00680 (block 7104, FIG. 7E), L00770 (block 7112, FIG. 7F), L00800 (block 7118, FIG. 7F), L00830 (block 7124, FIG. 7F), L00860 (block 7130, FIG. 7G), and L00890 (block 7136, FIG. 7G). In an embodiment of the invention, if US 122 answers one of these interactive questions incorrectly, he is not passed to a reminder subloop or provided a link to another topic. Instead, Instructor 1 320 or a member of group 428 (or both) explains to US 122 the correct answer.

Figure 8:
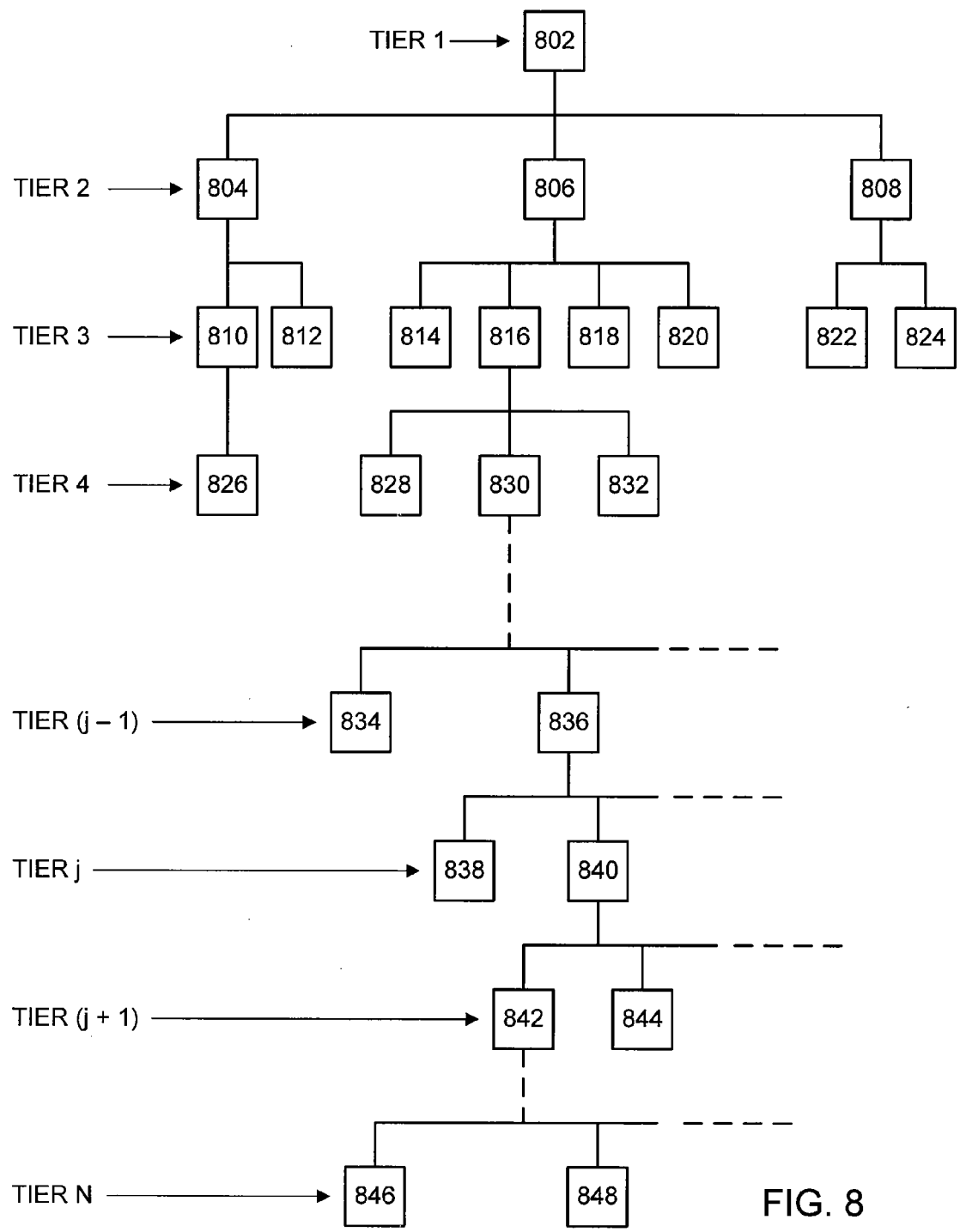
FIG. 8 shows a schematic of the hierarchical architecture of tutorials.

FIG. 8 shows a schematic of the hierarchical architecture of tutorials in an embodiment of the CBTS. In this perspective, each tutorial, regardless of whether it is a main module, a reminder loop, a subloop, or a subloop of a subloop . . . , is considered to be a tutorial belonging to a specific tier. A main module, such as tutorial 802, is designated a tier 1 tutorial. A subloop of a main module is designated a tier 2 tutorial. Tutorial 804-tutorial 808 are tier 2 tutorials. Similarly a subloop of a tier 2 tutorial is designated a tier 3 tutorial, and a subloop of a tier 3 tutorial is designated a tier 4 tutorial. In FIG. 8, tutorial 810-tutorial 824 are tier 3 tutorials, and tutorial 826-tutorial 832 are tier 4 tutorials. An arbitrary tier is designated tier j, where j is an integer greater than or equal to 1. The tier above tier j is designated tier (j−1), and the tier below tier j is designated tier (j+1). In FIG. 8, tutorial 834 and tutorial 836 are tier (j−1) tutorials; tutorial 838 and tutorial 840 are tier j tutorials; and tutorial 842 and tutorial 844 are tier (j+1) tutorials. The maximum value of j is N. Tutorial 846 and tutorial 848 are tier N tutorials.

Starting at tier 1 tutorial 802, an interactive question is presented to User 122. If a correct answer is provided by User 122, then tutorial 802 continues. If an incorrect answer is provided, however, the program then proceeds to one of the tier 2 tutorials (tutorial 804-tutorial 808). The specific tier 2 tutorial selected by the CBTS is based on the specific incorrect answer provided by User 122. In this example, US 122 provides an incorrect answer, and, based on that specific incorrect answer, the program then proceeds to tutorial 806. An interactive question in tutorial 806 is then presented to US 122. If a correct answer is provided by US 122, then the program returns to tutorial 802. In some embodiments, additional material may be presented in tutorial 806 before the program returns to tutorial 802.

If an incorrect answer is provided, however, the program then proceeds to one of the tier 3 tutorials (tutorial 814-tutorial 820). The specific tier 3 tutorial selected by the CBTS is based on the specific incorrect answer provided by User 122. In this example, US 122 provides an incorrect answer, and, based on that specific incorrect answer, the program proceeds to tutorial 816. The program proceeds in similar fashion down through lower level tiers until tier N (tutorial 846 and tutorial 848) is reached. If US 122 does not provide a correct answer to an interactive question to a tutorial in tier N, he is issued a recommendation to review one or more tutorials. In some embodiments, a recommendation to review one or more tutorials is issued if US 122 does not provide a correct answer to an interactive question to a tutorial in tier J, where 1<J<N.

For a specific tutorial, the number of tutorials on the next lower tier may vary. For example, tutorial 802 (tier 1) has three tutorials (tutorial 804-tutorial 8) on tier 2. Tutorial 804 (tier 2) has two tutorials (tutorial 810 and tutorial 812) on tier 3; tutorial 806 (tier 2) has four tutorials (tutorial 814-tutorial 820) on tier 3; and tutorial 808 (tier 2) has two tutorials (tutorial 822 and tutorial 824) on tier 3.

For a specific tutorial, the number of tiers below it may vary. For example, tutorial 804 (tier 2) has two tiers (tier 3 and tier 4) below it. Tutorial 808 has only one tier (tier 3) below it. Tutorial 806 (tier 2) has (N−2) tiers below it.

For a specific tutorial, the correspondence between an incorrect answer and a tutorial on the next lower tier may be one-to-one or many-to-one. For example, an interactive question in tutorial 802 has five possible answers: A, B, C, D, E. The correct answer is E. If the incorrect answer provided by US 122 is A or B, then the program proceeds to tutorial 804. If the incorrect answer provided is C, then the program proceeds to tutorial 806. If the incorrect answer provided is D, then the program proceeds to tutorial 808. Similarly, an interactive question in tutorial 804 has five possible answers: A, B, C, D, E. The correct answer is A. If the incorrect answer provided by US 122 is B, C, or E then the program proceeds to tutorial 810. If the incorrect answer provided is D, then the program proceeds to tutorial 812.

One skilled in the art may develop embodiments with hierarchies adapted for specific subjects and specific audiences. As discussed above, the number of tutorials in a tier and the number of tiers in a hierarchy may vary. In some embodiments, an incorrect answer to an interactive question may proceed to another tutorial (or open a dialogue, recommendation, or pointer to another tutorial) on the same or higher tier, including a different main module. As discussed above, one response to an interactive question, for example, may be "Don't Know." This response may indicate a need for remedial work on a prerequisite main module.

Figure 9:
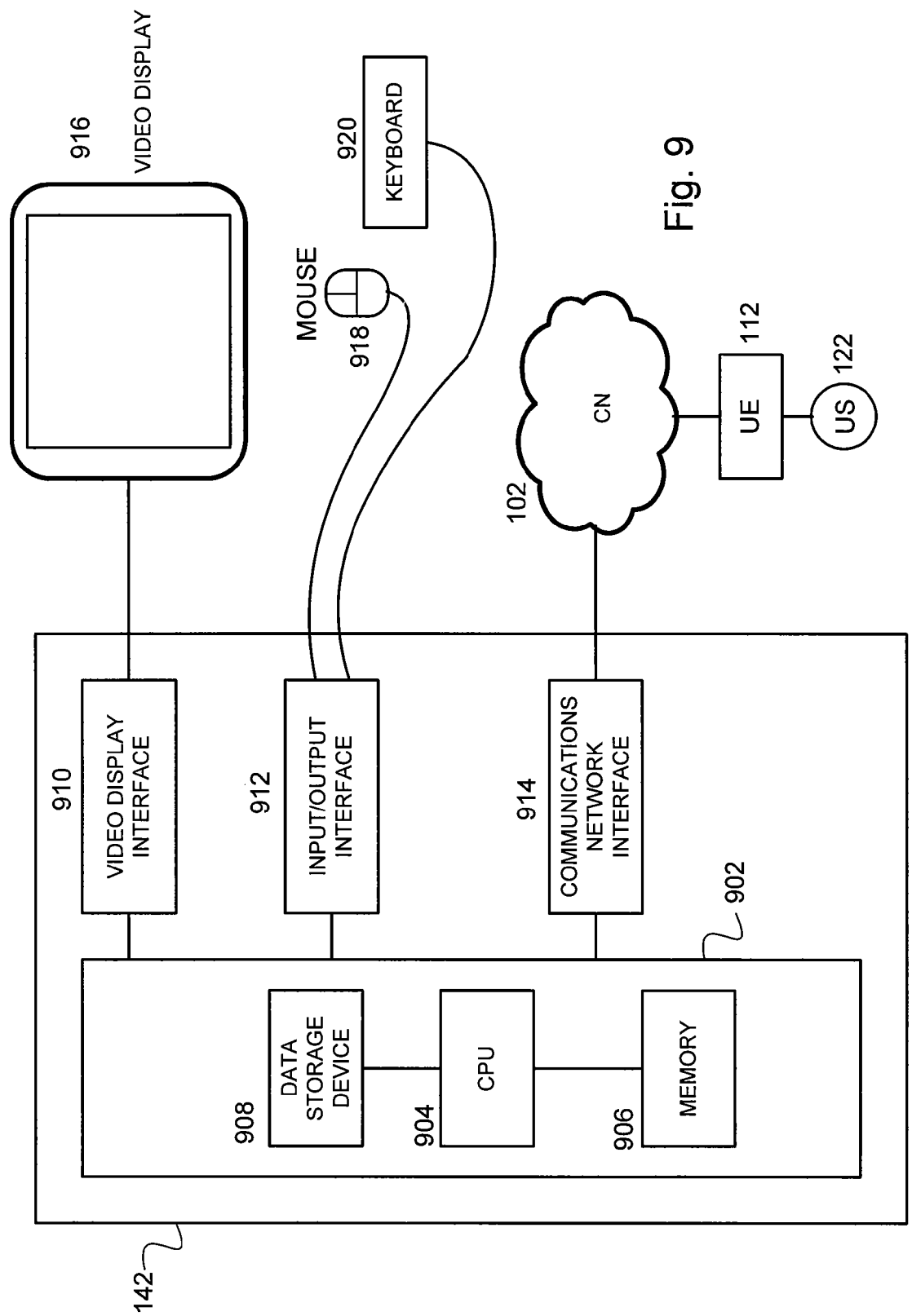
FIG. 9 shows a high-level schematic of an application server used to implement a computer-based tutorial system.

One embodiment of a CBTS may be implemented on a standalone personal computer similar to PC 202 shown previously in FIG. 2. Another embodiment of a CBTS may be implemented on a dedicated machine specifically configured (via hardware, software, firmware, or any combination thereof) for computer-based tutoring. Another embodiment of a CBTS may be implemented using an application server AS 142 (FIG. 1). One example of AS 142 comprises computer 902, schematically shown in FIG. 9. Computer 902 may be any type of well-known computer comprising a central processing unit (CPU) 904, memory 906 (also referred to as a memory module), and data storage device 908. Data storage device 908 may comprise a hard drive, non-volatile memory, or other computer readable medium (such as a magnetic disk or compact disk read only memory).

As is well known, a computer operates under control of computer software which defines the overall operation of the computer and applications. CPU 904 controls the overall operation of the computer and applications by executing computer program instructions which define the overall operation and applications. The computer program instructions may be stored in data storage device 908 and loaded into memory 906 when execution of the program instructions is desired. The method steps shown in the session illustrated by FIGS. 3A-3E, 4, 5A, 5B, and 6 and the presentation of the scripts shown in the flowchart of FIG. 7A-FIG. 7G may be defined by computer program instructions stored in the memory 906 or in the data storage device 908 (or in a combination of memory 906 and data storage device 908) and controlled by the CPU 904 executing the computer program instructions. For example, the computer program instructions may be implemented as computer executable code programmed by one skilled in the art to perform algorithms implementing the method steps and presentation. Accordingly, by executing the computer program instructions, the CPU 904 executes algorithms implementing the method steps and presentation.

Application server AS 142 may further comprise user input/output interface 912, which connects computer 902 to user input/output devices, such mouse 918 and keyboard 920, which enable a user (such as a network administrator or application provider) to operate computer 902. Application server AS 142 may further comprise a video display interface 910, which transforms signals from CPU 904 to signals which drive video display 916. Application server AS 142 may further comprise one or more network interfaces. For example, communications network interface 914 comprises a connection to core network CN 102 (FIG. 1). User US 122 may use user equipment UE 112 to communicate with computer 902 via CN 102. In some embodiments of AS 142, video display 916, mouse 918, and keyboard 920 are absent. Computer 902 is then remotely controlled via communications network interface 914 (for example, by UE 112).

Figure 10:
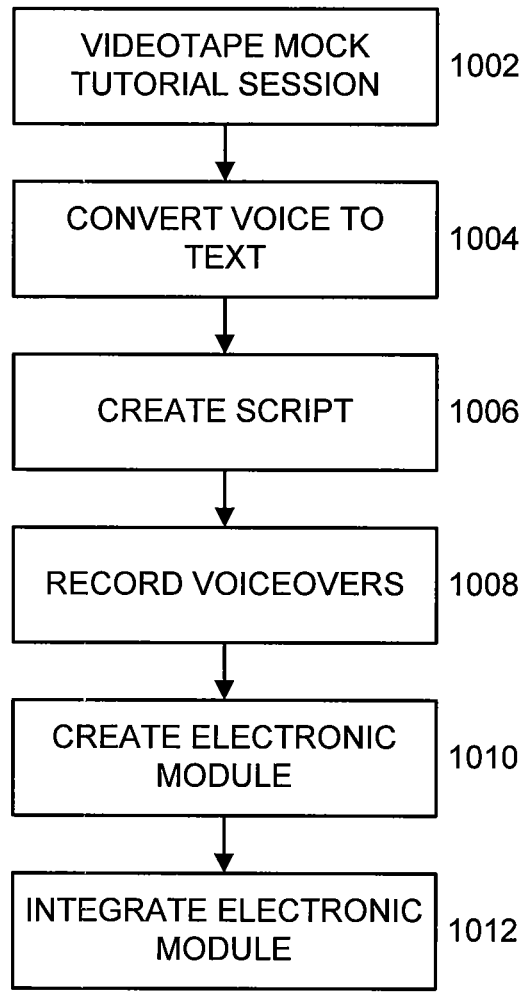
FIG. 10 shows a flowchart of steps for creating and integrating an electronic module.

A flowchart of a method, according to an embodiment of the invention, for creating a computer-based tutorial module (also referred to as an electronic module) is shown in FIG. 10. In step 1002, a live instructor performs a mock tutorial session, which is videotaped. The process then passes to step 1004, in which the spoken words (recorded on the videotape) are converted to text. The conversion may be performed by voice-to-text software, or manually transcribed. The process then passes to step 1006, in which a script is created. Various iterations of draft, review, and re-write of the script may be performed. The process then passes to step 1008, in which voiceovers for each character are recorded. The process then passes to step 1010 in which the new electronic module is programmed. The process then passes to step 1012, in which the new electronic module is integrated with the overall CBTS.

Advantageous features of embodiments of the invention include the following: comfort; dialogue; interactivity/artificial intelligence; reinforcement; control over the program; exercise loops; efficient use of time; visual, auditory, and emotional appeal; humor; reinforcement work; and enhanced memory function. These features are discussed in further detail below.

Comfort. A student may modify the appearance of the screen to suit his tastes. He may choose the cartoon characters to represent the instructor who presents the material and the group members who help present the materials. He may choose an avatar to represent himself.

Dialogue. Providing dialogue, instead of delivering information solely via voiceovers, prompts the student to be thinking while viewing instead of simply attempting to absorb volumes of information. In addition, the dialogue between the instructor and student, and the instructor with the group of characters, makes the experience more "real." The student looks at characters with friendly faces (which he has selected according to his personal tastes), who are speaking.

Interactivity/Artificial Intelligence. Continuous evaluation of whether the material is being processed and internalized by the students is provided since the program continuously asks questions that the student is asked to respond to. Most importantly, if the student is willing to spend as much time as is necessary, going through all of the conditional subloops (and subloops within subloops, and subloops within subloops within subloops, etc.), then each student will ultimately understand the material in full.

Reinforcement. The "Blue Box" and the "What Does This Mean?" button allow a student to reference at any time what they are learning and have learned.

Control over the Program. A user may pause the program, backspace as much as he needs, replay certain steps/tracks within the program as many times as he desires, fast-forward through the program, jump to other parts of the program, and see all the links that a particular topic has to all other topics. For example, suppose that a student wants some time to reflect on a theorem that appears in Blue Box 406 or on a diagram that appears in the Working Box 404. He can press pause, ruminate over these topics for as long as he needs, and then resume the main discussion when he is ready.

Exercise Loops. The program provides many exercise loops throughout all of its modules. If an exercise loop appears during a lecture, the student has the option to skip it by clicking on a button (for example, if he already knows the material well and does not need further practice). If the student wants to go through the exercise loop (to make sure that he is "getting it"), then the program will automatically proceed. At the conclusion of each exercise loop, the student will be asked if he wants to review the exercise loop again or not. If so, then the program will cycle through the exercise loop for however many times a student responds in this manner. If not, then the program will automatically proceed with instruction of the module chosen.

Efficient Use of Students' Time. If a student is unsure of a particular section of a topic, then he doesn't have to review the entire topic; he can simply go through a particular exercise loop, or a particular sequence of certain steps as many times as desired until it finally does sink in. That is, he may repeat the exercise loop once, twice, or an arbitrary number of times. He may also skip an entire exercise loop, or specific portions of an exercise loop. He does not have to be burdened with reviewing the entire topic simply because he is having trouble with one particular section. The CBTS allows the student to replay any section or subsection of any part of the program as many times as he desires. This procedure is the equivalent to having a private tutor who will spend as much time on a particular topic, concept, or detail as a student desires, without having to repeat subject matter the student already knows.

Visual, Auditory, and Emotional Appeal. A student sees the graphics in the Working Box 404 while "speaking with" an actual face, while hearing the vocal instruction, while being charmed by whichever character suits his tastes. Each of these actions individually is conducive to the learning process. Furthermore, when they are all integrated cohesively and utilized at the same time, as is done in the CBTS, cognitive understanding is enhanced, given that more areas of the brain are stimulated by these different conduits.

Humor. Another benefit to having animated cartoons doing the teaching and learning is that it allows for a humorous bantering to occur amongst these characters. Elements of comedy are fused into the script of each module, thereby adding even more comfort and enjoyment for the student, making it even easier for him to learn.

Reinforcement Work. At the end of each section, a link is provided that takes a student to a set of problems that reinforces the topic he has just covered. Answers are provided so that he knows whether they are correct or not, as he works out practice problems.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for computer-based instruction, the method comprising the steps of:

receiving, at a computer programmed with computer program instructions for the computer-based instruction stored on a non-transitory computer readable medium, a plurality of selections, wherein the plurality of selections is sent by a student, and wherein the plurality of selections select an animated instructor, an animated avatar representing the student, at least one animated classmate, and a first lesson;

in response to the plurality of selections, executing, by the computer, at least a portion of the computer program instructions to perform the steps of:

presenting, on a video display operably coupled to the computer, a first portion of the first lesson by the animated instructor, wherein the animated instructor, the animated avatar, and the at least one animated classmate are displayed on the video display during the entirety of the first portion of the first lesson; and presenting, on the video display, a first interactive question based on the first portion of the first lesson;

receiving, at the computer, a first answer to the first interactive question, wherein the first answer is send by the student;

in response to the first answer, executing, by the computer, at least a portion of the computer program instructions to perform the step of determining whether the first answer is correct or incorrect;

upon determining that the first answer is correct, executing, by the computer, at least a portion of the computer program instructions to perform the step of presenting, on the video display, a second portion of the first lesson by the animated instructor, wherein the animated instructor, the animated avatar, and the at least one animated classmate are displayed on the video display during the entirety of the second portion of the first lesson; and upon determining that the first answer is incorrect:

executing, by the computer, at least a portion of the computer program instructions to perform the steps of:

presenting, on the video display, at least a portion of a second lesson by the animated instructor, wherein the second lesson is based on the incorrect first answer, and wherein the animated instructor, the animated avatar, and the at least one animated classmate are displayed on the video display during the entirety of the at least a portion of the second lesson; and presenting, on the video display, a second interactive question based on the at least a portion of the second lesson previously presented by the animated instructor;

receiving, at the computer, a second answer to the second interactive question, wherein the second answer is send by the student;

in response to the second answer, executing, by the computer, at least a portion of the computer program instructions to perform the step of determining whether the second answer is correct or incorrect;

upon determining that the second answer is correct, executing, by the computer, at least a portion of the computer program instructions to perform the step of returning to the first lesson; and upon determining that the second answer is incorrect:

executing, by the computer, at least a portion of the computer program instructions to perform the steps of:

presenting, on the video display, at least a portion of a third lesson by the animated instructor, wherein the third lesson is based on the incorrect second answer, and wherein the animated instructor, the animated avatar, and the at least one animated classmate are displayed on the video display during the entirety of the at least a portion of the third lesson; and presenting, on the video display, a third interactive question based on the at least a portion of the third lesson previously presented by the animated instructor;

receiving, at the computer, a third answer to the third interactive question, wherein the third answer is sent by the student;

in response to the third answer, executing, by the computer, at least a portion of the computer program instructions to perform the step of determining whether the third answer is correct or incorrect;

upon determining that the third answer is correct, executing, by the computer, at least a portion of the computer program instructions to perform the step of returning to the second lesson; and upon determining that the third answer is incorrect, executing, by the computer, at least a portion of the computer program instructions to perform the step of presenting, on the video display, at least a portion of a fourth lesson by the animated instructor, wherein the fourth lesson is based on the incorrect third answer, and wherein the animated instructor, the animated avatar, and the at least one animated classmate are displayed on the video display during the entirety of the at least a portion of the fourth lesson.

2. A method for computer-based instruction, the method comprising the steps of:

receiving, at a computer programmed with computer program instructions for the computer-based instruction stored on a non-transitory computer readable medium, a plurality of selections, wherein the plurality of selections is sent by a student, and wherein the plurality of selections select an animated instructor, an animated avatar representing the student, at least one animated classmate, and a first lesson;

in response to the plurality of selections, executing, by the computer, at least a portion of the computer program instructions to perform the steps of:

presenting, on a video display operably coupled to the computer, a first portion of the first lesson by the animated instructor, wherein the animated instructor, the animated avatar, and the at least one animated classmate are displayed on the video display during the entirety of the first portion of the first lesson; and presenting, on the video display, a first interactive question based on the first portion of the first lesson;

receiving, at the computer, a first answer to the first interactive question, wherein the first answer is sent by the student;

in response to the first answer, executing, by the computer, at least a portion of the computer program instructions to perform the step of determining whether the first answer is correct or incorrect;

upon determining that the first answer is correct, executing, by the computer, at least a portion of the computer program instructions to perform the step of presenting, on the video display, a second portion of the first lesson by the animated instructor, wherein the animated instructor, the animated avatar, and the at least one animated classmate are displayed on the video display during the entirety of the second portion of the first lesson; and upon determining that the first answer is incorrect, executing, by the computer, at least a portion of the computer program instructions to perform the step of presenting, on the video display, at least a portion of a second lesson by the animated instructor, wherein the second lesson is based on the incorrect first answer, and wherein the animated instructor, the animated avatar, and the at least one animated classmate are displayed on the video display during the entirety of the at least a portion of the second lesson;

wherein:

the first lesson is one of at least one tier one lesson in a hierarchy of lessons;

the second lesson is one of at least one tier two lesson in the hierarchy of lessons;

the hierarchy of lessons comprises N tiers, wherein N is an integer greater than one;

each lesson in the hierarchy of lessons is one of at least one tier j lesson, wherein j is an integer greater than or equal to one and less than or equal to N; and for each j greater than one and less than or equal to N, each of the at least one tier j lesson is based on at least one of the at least one tier (j−1) lesson, and subject matter in each of the at least one tier j lesson is a subset of subject matter in the at least one of the at least one tier (j−1) lesson.

3. The method of claim 2, further comprising the steps of:

for each j greater than one and less than or equal to N, executing, by the computer, at least a portion of the computer program instructions to perform the step of presenting, on the video display, a j-th interactive question based on at least a portion of a specific tier j lesson;

receiving, at the computer, a j-th answer to the j-th interactive question, wherein the j-th answer is sent by the student;

in response to the j-th answer, executing, by the computer, at least a portion of the computer program instructions to perform the step of determining whether the j-th answer is correct or incorrect;

upon determining that the j-th answer is correct, executing, by the computer, at least a portion of the computer program instructions to perform the step of returning to a specific tier (j−1) lesson; and upon determining that the j-th answer is incorrect, executing, by the computer, at least a portion of the computer program instructions to perform the step of:

determining whether (j+1) is less than, equal to, or greater than a predetermined integer J, wherein J is greater than 1 and less than N;

upon determining that (j+1) is less than or equal to J, executing, by the computer, at least a portion of the computer program instructions to perform the step of presenting, on the video display, at least a portion of a specific tier (j+1) lesson by the animated instructor, wherein the specific tier (j+1) lesson is based on the incorrect j-th answer, and wherein the animated instructor, the animated avatar, and the at least one animated classmate are displayed on the video display during the entirety of the at least a portion of the specific tier (j+1) lesson; and upon determining that (j+1) is greater than J, executing, by the computer, at least a portion of the computer program instructions to perform the step of issuing, on the video display, a recommendation for review.

4. The method of claim 1, further comprising the step of executing, by the computer, at least a portion of the computer program instructions to perform the step of:

presenting, on the video display, an internal question by the animated instructor; and receiving, on the video display, an answer to the internal question from at least one of:

the animated instructor;

the animated avatar; or the at least one animated classmate.

5. The method of claim 1, further comprising the step of executing, by the computer, at least a portion of the computer program instructions to perform the step of:

presenting, on the video display, an internal question by at least one of:

the animated avatar; or the at least one animated classmate; and receiving, on the video display, an answer to the internal question from at least one of:

the animated instructor;

the animated avatar; or the at least one animated classmate.

6. The method of claim 1, further comprising the step of executing, by the computer, at least a portion of the computer program instructions to perform the step of:

holding a dialogue, on the video display, between the animated instructor and at least one of:
the animated avatar; or
the at least one animated classmate.

7. The method of claim 1, further comprising the step of executing, by the computer, at least a portion of the computer program instructions to perform the step of:
holding a dialogue, on the video display, between a first animated classmate selected from the at least one animated classmate and at least one of:
the animated avatar; or
a second animated classmate selected from the at least one animated classmate.

8. A method for computer-based instruction, the method comprising the steps of:
receiving, at a computer programmed with computer program instructions for the computer-based instruction stored on a non-transitory computer readable medium, a plurality of selections, wherein the plurality of selections is sent by a student, and wherein the plurality of selections select an animated instructor, an animated avatar representing the student, at least one animated classmate, and a first lesson;
in response to the plurality of selections, executing, by the computer, at least a portion of the computer program instructions to perform the steps of:
presenting, on a video display operably coupled to the computer, a first portion of the first lesson by the animated instructor, wherein the animated instructor, the animated avatar, and the at least one animated classmate are displayed on the video display during the entirety of the first portion of the first lesson; and
presenting, on the video display, a first interactive question based on the first portion of the first lesson;
receiving, at the computer, a first answer to the first interactive question, wherein the first answer is sent by the student;
in response to the first answer, executing, by the computer, at least a portion of the computer program instructions to perform the step of determining whether the first answer is correct or incorrect;
upon determining that the first answer is correct, executing, by the computer, at least a portion of the computer program instructions to perform the step of presenting, on the video display, a second portion of the first lesson by the animated instructor, wherein the animated instructor, the animated avatar, and the at least one animated classmate are displayed on the video display during the entirety of the second portion of the first lesson;
upon determining that the first answer is incorrect, executing, by the computer, at least a portion of the computer program instructions to perform the step of presenting, on the video display, at least a portion of a second lesson by the animated instructor, wherein the second lesson is based on the incorrect first answer, and wherein the animated instructor, the animated avatar, and the at least one animated classmate are displayed on the video display during the entirety of the at least a portion of the second lesson;
executing, by the computer, at least a portion of the computer program instructions to perform the step of displaying, on the video display, a first fundamental subject matter of the first lesson in a first supplementary display field when the first fundamental subject matter is presented at a first time during the first lesson;
executing, by the computer, at least a portion of the computer program instructions to perform the step of displaying, on the video display, a second fundamental subject matter of the first lesson in a second supplementary display field when the second fundamental subject matter is presented at a second time during the first lesson; and
executing, by the computer, at least a portion of the computer program instructions to perform the step of maintaining, on the video display, the display of the first supplementary display field and the second supplementary display field during the first lesson.

9. The method of claim 8, further comprising the steps of:
receiving, at the computer, input selecting the first supplementary display field, wherein the input selecting the first supplementary display field is sent by the student;
upon receiving the input selecting the first supplementary display field, executing, by the computer, at least a portion of the computer program instructions to perform the step of returning to the first time during the first lesson when the first fundamental subject matter was presented;
receiving, at the computer, input selecting the second supplementary display field, wherein the input selecting the second supplementary display field is sent by the student; and
upon receiving the input selecting the second supplementary display field, executing, by the computer, at least a portion of the computer program instructions to perform the step of returning to the second time during the first lesson when the second fundamental subject matter was presented.

10. A non-transitory computer readable medium storing computer program instructions for computer-based instruction, wherein the computer program instructions, when executed by a processor in a computer, cause the computer to perform a method comprising the steps of:
receiving a plurality of selections, wherein the plurality of selections is sent by a student, and wherein the plurality of selections select an animated instructor, an animated avatar representing the student, at least one animated classmate, and a first lesson;
presenting, on a video display operably coupled to the computer, a first portion of the first lesson by the animated instructor, wherein the animated instructor, the animated avatar, and the at least one animated classmate are displayed on the video display during the entirety of the first portion of the first lesson;
presenting, on a video display, a first interactive question based on the first lesson;
receiving a first answer to the first interactive question, wherein the first answer is sent by the student;
determining whether the first answer is correct or incorrect;
upon determining that the first answer is correct, presenting, on the video display, a second portion of the first lesson by the animated instructor, wherein the animated instructor, the animated avatar, and the at least one animated classmate are displayed on the video display during the entirety of the second portion of the first lesson; and
upon determining that the first answer is incorrect, presenting, on the video display, at least a portion of a second lesson by the animated instructor, wherein the second lesson is based on the incorrect first answer, and wherein the animated instructor, the animated avatar, and the at least one animated classmate are displayed on the video display during the entirety of the at least a portion of the second lesson;

wherein:
the first lesson is one of at least one tier one lesson in a hierarchy of lessons;
the second lesson is one of at least one tier two lesson in the hierarchy of lessons;
the hierarchy of lessons comprises N tiers, wherein N is an integer greater than one;
each lesson in the hierarchy of lessons is one of at least one tier j lesson, wherein j is an integer greater than or equal to one and less than or equal to N; and
for each j greater than one and less than or equal to N, each of the at least one tier j lesson is based on at least one of the at least one tier (j−1) lesson, and subject matter in each of the at least one tier j lesson is a subset of subject matter in the at least one of the at least one tier (j−1) lesson.

11. The non-transitory computer readable medium of claim 10, wherein the method further comprises the steps of:
for each j greater than one and less than or equal to N, presenting, on the video display, a j-th interactive question based on at least a portion of a specific tier j lesson;
receiving a j-th answer to the j-th interactive question, wherein the j-th answer is sent by the student;
determining whether the j-th answer is correct or incorrect;
upon determining that the j-th answer is correct, returning to a specific tier (j−1) lesson; and
upon determining that the j-th answer is incorrect:
determining whether (j+1) is greater than, equal to, or greater than a predetermined integer J, wherein J is greater than 1 and less than N;
upon determining that (j+1) is less than or equal to J, presenting, on the video display, at least a portion of a specific tier (j+1) lesson, wherein the specific tier (j+1) lesson is based on the incorrect j-th answer, and wherein the animated instructor, the animated avatar, and the at least one animated classmate are displayed on the video display during the entirety of the at least a portion of the specific tier (j+1) lesson; and
upon determining that (j+1) is greater than J, issuing, on the video display, a recommendation for review.

12. A non-transitory computer readable medium storing computer program instructions for computer-based instruction, wherein the computer program instructions, when executed by a processor in a computer, cause the computer to perform a method comprising the steps of:
receiving a plurality of selections, wherein the plurality of selections is sent by a student, and wherein the plurality of selections select an animated instructor, an animated avatar representing the student, at least one animated classmate, and a first lesson;
presenting, on a video display operably coupled to the computer, a first portion of the first lesson by the animated instructor, wherein the animated instructor, the animated avatar, and the at least one animated classmate are displayed on the video display during the entirety of the first portion of the first lesson;
presenting, on the video display, a first interactive question based on the first portion of the first lesson;
receiving a first answer to the first interactive question, wherein the first answer is sent by the student;
determining whether the first answer is correct or incorrect;
upon determining that the first answer is correct, presenting, on the video display, a second portion of the first lesson by the animated instructor, wherein the animated instructor, the animated avatar, and the at least one animated classmate are displayed on the video display during the entirety of the second portion of the first lesson;
upon determining that the first answer is incorrect, presenting, on the video display, at least a portion of a second lesson by the animated instructor, wherein the second lesson is based on the incorrect first answer, and wherein the animated instructor, the animated avatar, and the at least one animated classmate are displayed on the video display during the entirety of the at least a portion of the second lesson;
presenting, on the video display, a second interactive question based on the at least a portion of the second lesson previously presented by the animated instructor;
receiving a second answer to the second interactive question, wherein the second interactive question is sent by the student;
determining whether the second answer is correct or incorrect;
upon determining that the second answer is correct, returning to the first lesson;
upon determining that the second answer is incorrect, presenting, on the video display, at least a portion of a third lesson by the animated instructor, wherein the third lesson is based on the incorrect second answer, and wherein the animated instructor, the animated avatar, and the at least one animated classmate are displayed on the video display during the entirety of the at least a portion of the third lesson;
presenting, on the video display, a third interactive question based on the at least a portion of the third lesson previously presented by the animated instructor;
receiving a third answer to the third interactive question, wherein the third answer is sent by the student;
determining whether the third answer is correct or incorrect;
upon determining that the third answer is correct, returning to the second lesson; and
upon determining that the third answer is incorrect, presenting, on the video display, at least a portion of a fourth lesson by the animated instructor, wherein the fourth lesson is based on the incorrect third answer, and wherein the animated instructor, the animated avatar, and the at least one animated classmate are displayed on the video display during the entirety of the at least a portion of the fourth lesson.

13. The non-transitory computer readable medium of claim 12, wherein the method further comprises the steps of:
presenting, on the video display, an internal question by the animated instructor; and
receiving, on the video display, an answer to the internal question from at least one of:
the animated instructor;
the animated avatar; or
the at least one animated classmate.

14. The non-transitory computer readable medium of claim 12, wherein the method further comprises the steps of:
presenting, on the video display, an internal question by at least one of:
the animated avatar; or
the at least one animated classmate; and
receiving, on the video display, an answer to the internal question from at least one of:
the animated instructor;
the animated avatar; or
the at least one animated classmate.

15. The non-transitory computer readable medium of claim 12, wherein the method further comprises the step of:
holding a dialogue, on the video display, between the animated instructor and at least one of:
the animated avatar; or
the at least one animated group classmate.

16. The non-transitory computer readable medium of claim 12, wherein the method further comprises the step of:
holding a dialogue, on the video display, between a first animated classmate selected from the at least one animated classmate and at least one of:
the animated avatar; or
a second animated classmate selected from the at least one animated classmate.

17. A non-transitory computer readable medium storing computer program instructions for computer-based instruction, wherein the computer program instructions, when executed by a processor in a computer, cause the computer to perform a method comprising the steps of:
receiving a plurality of selections, wherein the plurality of selections is sent by a student, and wherein the plurality of selections select an animated instructor, an animated avatar representing the student, at least one animated classmate, and a first lesson;
presenting, on a video display operably coupled to the computer, a first portion of the first lesson by the animated instructor, wherein the animated instructor, the animated avatar, and the at least one animated classmate are displayed on the video display during the entirety of the first portion of the first lesson;
presenting, on the video display, a first interactive question based on the first lesson;
receiving a first answer to the first interactive question, wherein the first answer is sent by the student;
determining whether the first answer is correct or incorrect;
upon determining that the first answer is correct, presenting, on the video display, a second portion of the first lesson by the animated instructor, wherein the animated instructor, the animated avatar, and the at least one animated classmate are displayed during the entirety of the second portion of the first lesson;
upon determining that the first answer is incorrect, presenting, on the video display, at least a portion of a second lesson by the animated instructor, wherein the second lesson is based on the incorrect first answer, and wherein the animated instructor, the animated avatar, and the at least one animated classmate are displayed on the video display during the entirety of the at least a portion of the second lesson;
displaying, on the video display, a first fundamental subject matter of the first lesson in a first supplementary display field when the first fundamental subject matter is presented at a first time during the first lesson;
displaying, on the video display, a second fundamental subject matter of the first lesson in a second supplementary display field when the second fundamental subject matter is presented at a second time during the first lesson; and
maintaining, on the video display, the display of the first supplementary display field and the second supplementary display field during the first lesson.

18. The non-transitory computer readable medium of claim 17, wherein the method further comprises the steps of:
receiving input selecting the first supplementary display field, wherein the input selecting the first supplementary display field is sent by the student;
upon receiving the input selecting the first supplementary display field, returning to the first time during the first lesson when the first fundamental subject matter was presented;
receiving input selecting the first supplementary display field, wherein the input selecting the first supplementary display field is sent by the student; and
upon receiving the input selecting the second supplementary field, returning to the second time during the first lesson when the second fundamental subject matter was presented.

19. An application server for computer-based instruction, the application server comprising:
a central processing unit;
a memory module;
a non-transitory computer readable medium storing computer program instructions for the computer-based instruction; and
a communications network interface configured to:
receive input from user equipment operated by a student; and
send output to the user equipment;
wherein the application server is configured to:
receive a plurality of selections, wherein the plurality of selections is sent by the student, and wherein the plurality of selections select an animated instructor, an animated avatar representing the student, at least one animated classmate, and a first lesson;
in response to the plurality of selections, execute at least a portion of the computer program instructions to:
present on the user equipment a first portion of the first lesson by the animated instructor, wherein the animated instructor, the animated avatar, and the at least one animated classmate are displayed on the user equipment during the entirety of the first portion of the first lesson; and
present, on the user equipment, a first interactive question based on the first portion of the first lesson;
receive from the student a first answer to the first interactive question;
in response to the first answer, execute at least a portion of the computer program instructions to determine whether the first answer is correct or incorrect;
upon determining that the first answer is correct, execute at least a portion of the computer program instructions to present, on the user equipment, a second portion of the first lesson by the animated instructor, wherein the animated instructor, the animated avatar, and the at least one animated classmate are displayed on the user equipment during the entirety of the second portion of the first lesson;
upon determining that the first answer is incorrect:
execute at least a portion of the computer program instructions to:
present, on the user equipment, at least a portion of a second lesson by the animated instructor, wherein the second lesson is based on the incorrect first answer, and wherein the animated instructor, the animated avatar, and the at least one animated classmate are displayed on the user equipment during the entirety of the at least a portion of the second lesson; and present, on the user equipment, a second interactive question based on the at least a portion of the second lesson previously presented by the animated instructor;
receive from the student a second answer to the second interactive question;
execute at least a portion of the computer program instructions to determine whether the second answer is correct or incorrect;
upon determining that the second answer is correct, execute at least a portion of the computer program instructions to return to the first lesson;
upon determining that the second answer is incorrect:
execute at least a portion of the computer program instructions to:
present, on the user equipment, at least a portion of a third lesson by the animated instructor, wherein the third lesson is based on the incorrect second answer, and wherein the animated instructor, the animated avatar, and the at least one animated classmate are displayed on the user equipment during the entirety of the at least a portion of the third lesson; and
present, on the user equipment, a third interactive question based on the at least a portion of the third lesson previously presented by the animated instructor;
receive from the student a third answer to the third interactive question;
in response to the third answer, execute at least a portion of the computer program instructions to determine whether the third answer is correct or incorrect;
upon determining that the third answer is correct, execute at least a portion of the computer program instructions to return to the second lesson; and
upon determining that the third answer is incorrect, execute at least a portion of the computer program instructions to present, on the user equipment, at least a portion of a fourth lesson by the animated instructor, wherein the fourth lesson is based on the incorrect third answer, and wherein the animated instructor, the animated avatar, and the at least one animated classmate are displayed on the user equipment during the entirety of the at least a portion of the fourth lesson.

20. The application server of claim 19, wherein the application server is further configured to execute at least a portion of the computer instructions to:
present, on the user equipment, an internal question by the animated instructor; and
receive, on the user equipment, an answer to the internal question from at least one of:
the animated instructor;
the animated avatar; or
the at least one animated classmate.

21. The application server of claim 19, wherein the application server is further configured to execute at least a portion of the computer instructions to:
present, on the user equipment, an internal question by at least one of:
the animated avatar; or
the at least one animated classmate; and
receive, on the user equipment, an answer to the internal question from at least one of:
the animated instructor;
the animated avatar; or
the at least one animated classmate.

22. The application server of claim 19, wherein the application server is further configured to execute at least a portion of the computer instructions to:
hold a dialogue, on the user equipment, between the animated instructor and at least one of:
the animated avatar; or
the at least one animated classmate.

23. The application server of claim 19, wherein the application server is further configured to execute at least a portion of the computer instructions to:
hold a dialogue, on the user equipment, between a first animated classmate selected from the at least one animated group member and at least one of:
the animated avatar; or
a second animated classmate selected from the at least one animated classmate.

24. An application server for computer-based instruction, the application server comprising:
a central processing unit;
a memory module;
a non-transitory computer readable medium storing computer program instructions for the computer-based instruction; and
a communications network interface configured to:
receive input from user equipment operated by a student; and
send output to the user equipment;
wherein the application server is configured to:
receive a plurality of selections, wherein the plurality of selections is sent by the student, and wherein the plurality of selections select an animated instructor, an animated avatar representing the student, at least one animated classmate, and a first lesson;
in response to the plurality of selections, execute at least a portion of the computer program instructions to:
present on the user equipment a first portion of the first lesson by the animated instructor, wherein the animated instructor, the animated avatar, and the at least one animated classmate are displayed on the user equipment during the entirety of the first portion of the first lesson; and
present, on the user equipment, a first interactive question based on the first portion of the first lesson;
receive from the student a first answer to the first interactive question;
in response to the first answer, execute at least a portion of the computer program instructions to determine whether the first answer is correct or incorrect;
upon determining that the first answer is correct, execute at least a portion of the computer program instructions to present, on the user equipment, a second portion of the first lesson by the animated instructor, wherein the animated instructor, the animated avatar, and the at least one animated classmate are displayed on the user equipment during the entirety of the second portion of the first lesson;
upon determining that the first answer is incorrect, execute at least a portion of the computer program instructions to present, on the user equipment, at least a portion of a second lesson by the animated instructor, wherein the second lesson is based on the incorrect first answer, and wherein the animated tutor instructor, the animated avatar, and the at least one animated classmate are displayed on the user equipment during the entirety of the at least a portion of the second lesson;

execute at least a portion of the computer program instructions to display on the user equipment a first fundamental subject matter of the first lesson in a first supplementary display field when the first fundamental subject matter is presented at a first time during the first lesson;

execute at least a portion of the computer program instructions to display on the user equipment a second fundamental subject matter of the first lesson in a second supplementary display field when the second fundamental subject matter is presented at a second time during the first lesson; and execute at least a portion of the computer program instructions to maintain, on the user equipment, the display of the first supplementary display field and the second supplementary display field during the first lesson.

25. The application server of claim 24, wherein the application server is further configured to:

receive input selecting the first supplementary display field, wherein the input selecting the first supplementary display field is sent by the student;

in response to the input selecting the first supplementary display field, execute at least a portion of the computer program instructions to return to the first time during the first lesson when the first fundamental subject matter was presented;

receive input selecting the second supplementary display field, wherein the input selecting the second supplementary display field is sent by the student; and in response to the input selecting the second supplementary display field, execute at least a portion of the computer program instructions to return to the second time during the first lesson when the second fundamental subject matter was presented.

26. An application server for computer-based instruction, the application server comprising:

a central processing unit;

a memory module;

a non-transitory computer readable medium storing computer program instructions for the computer-based instruction; and a communications network interface configured to:
receive input from user equipment operated by a student; and
send output to the user equipment;

wherein the application server is configured to:
receive a plurality of selections, wherein the plurality of selections is sent by the student, and wherein the plurality of selections select an animated instructor, an animated avatar representing the student, at least one animated classmate, and a first lesson;

in response to the plurality of selections, execute at least a portion of the computer program instructions to:

present on the user equipment a first portion of the first lesson by the animated instructor, wherein the animated instructor, the animated avatar, and the at least one animated classmate are displayed on the user equipment during the entirety of the first portion of the first lesson; and present, on the user equipment, a first interactive question based on the first portion of the first lesson;

receive from the student a first answer to the first interactive question;

in response to the first answer, execute at least a portion of the computer program instructions to determine whether the first answer is correct or incorrect;

upon determining that the first answer is correct, execute at least a portion of the computer program instructions to present, on the user equipment, a second portion of the first lesson by the animated instructor, wherein the animated instructor, the animated avatar, and the at least one animated classmate are displayed on the user equipment during the entirety of the second portion of the first lesson;

upon determining that the first answer is incorrect, execute at least a portion of the computer program instructions to present, on the user equipment, at least a portion of a second lesson by the animated instructor, wherein the second lesson is based on the incorrect first answer, and wherein the animated instructor, the animated avatar, and the at least one animated classmate are displayed on the user equipment during the entirety of the at least a portion of the second lesson; and wherein:

the first lesson is one of at least one tier one lesson in a hierarchy of lessons;

the second lesson is one of at least one tier two lesson in the hierarchy of lessons;

the hierarchy of lessons comprises N tiers, wherein N is an integer greater than one;

each lesson in the hierarchy of lessons is one of at least one tier j lesson, wherein j is an integer greater than or equal to one and less than or equal to N; and for each j greater than one and less than or equal to N, each of the at least one tier j lesson is based on at least one of the at least one tier (j−1) lesson, and subject matter in each of the at least one tier j lesson is a subset of subject matter in the at least one of the at least one tier (j−1) lesson.

* * * * *